United States Patent
Mishra et al.

(10) Patent No.: US 12,541,485 B1
(45) Date of Patent: Feb. 3, 2026

(54) ANALYSIS OF JAVASCRIPT OBJECT NOTATION (JSON) STRUCTURES GENERATED THROUGH VARIOUS SOURCES

(71) Applicant: Dell Products L.P., Round Rock, TX (US)

(72) Inventors: Abhishek Mishra, Bangalore (IN); Mallika Chennasamudram, Bangalore (IN); Bhupendra Kumar Pal, Noida (IN); Anusha N, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/906,572

(22) Filed: Oct. 4, 2024

(51) Int. Cl.
*G06F 16/14* (2019.01)
*G06F 16/16* (2019.01)

(52) U.S. Cl.
CPC .......... *G06F 16/148* (2019.01); *G06F 16/168* (2019.01)

(58) Field of Classification Search
CPC ............................ G06F 16/148; G06F 16/168
USPC ......................................................... 707/722
See application file for complete search history.

(56) References Cited

U.S. PATENT DOCUMENTS

| | | | | |
|---|---|---|---|---|
| 8,280,883 B2* | 10/2012 | Hao | ........... | H04M 3/53333 707/736 |
| 9,020,988 B2* | 4/2015 | Rubenstein | ....... | G06F 16/24556 707/723 |
| 2011/0196953 A1* | 8/2011 | Samaha | ........... | G06Q 10/10 709/223 |
| 2012/0124066 A1* | 5/2012 | Chen | ........... | H04L 67/12 707/756 |
| 2013/0346361 A1* | 12/2013 | Hashimoto | ........... | G06F 16/16 707/808 |
| 2014/0244600 A1* | 8/2014 | Schmidt | ........... | G06F 16/1748 707/692 |
| 2015/0281292 A1* | 10/2015 | Murayama | ........... | G06F 3/0481 715/753 |
| 2018/0121562 A1* | 5/2018 | Watkins | ........... | G06F 16/80 |
| 2024/0338343 A1* | 10/2024 | Kammachi Sreedhar | ........... | G06F 16/148 |
| 2025/0103234 A1* | 3/2025 | Li | ........... | G06F 3/0649 |
| 2025/0278591 A1* | 9/2025 | Horiguchi | ........... | G06F 40/174 |

FOREIGN PATENT DOCUMENTS

| | | | | |
|---|---|---|---|---|
| CN | 115510000 A | * | 12/2022 | ........... G06F 16/16 |
| CN | 117827266 A | * | 4/2024 | ......... G06F 16/1873 |
| CN | 118093361 A | * | 5/2024 | ............... G06F 8/65 |

(Continued)

*Primary Examiner* — Phuong Thao Cao
(74) *Attorney, Agent, or Firm* — Chamberlain, Hrdlicka, White, Williams & Aughtry; Aly Z. Dossa

(57) ABSTRACT

A method for managing data includes: receiving a file analysis request from a user, in which the request includes merging criteria, a first data path to access a first file, a second data path to access a second file, and a third data path to access a third file; obtaining the first file using the first data path, the second file using the second data path, and the third file using the third data path; analyzing the merging criteria; inferring, based on a determination, that the second file is suitable to be merged with the first file and the third file is not suitable to be merged with the first file; merging, based on the merging criteria, the first file and the second file to generate an output file; and initiating, via a graphical user interface (GUI), displaying of the output file to the user.

20 Claims, 20 Drawing Sheets

(56) References Cited

FOREIGN PATENT DOCUMENTS

| | | | | |
|---|---|---|---|---|
| CN | 118733717 A | * | 10/2024 | ............ G06F 40/284 |
| RU | 2768209 C1 | * | 3/2022 | ............. G06F 18/23 |
| WO | WO-2013177905 A1 | * | 12/2013 | ............ H03M 7/707 |

* cited by examiner

FIG. 2.1

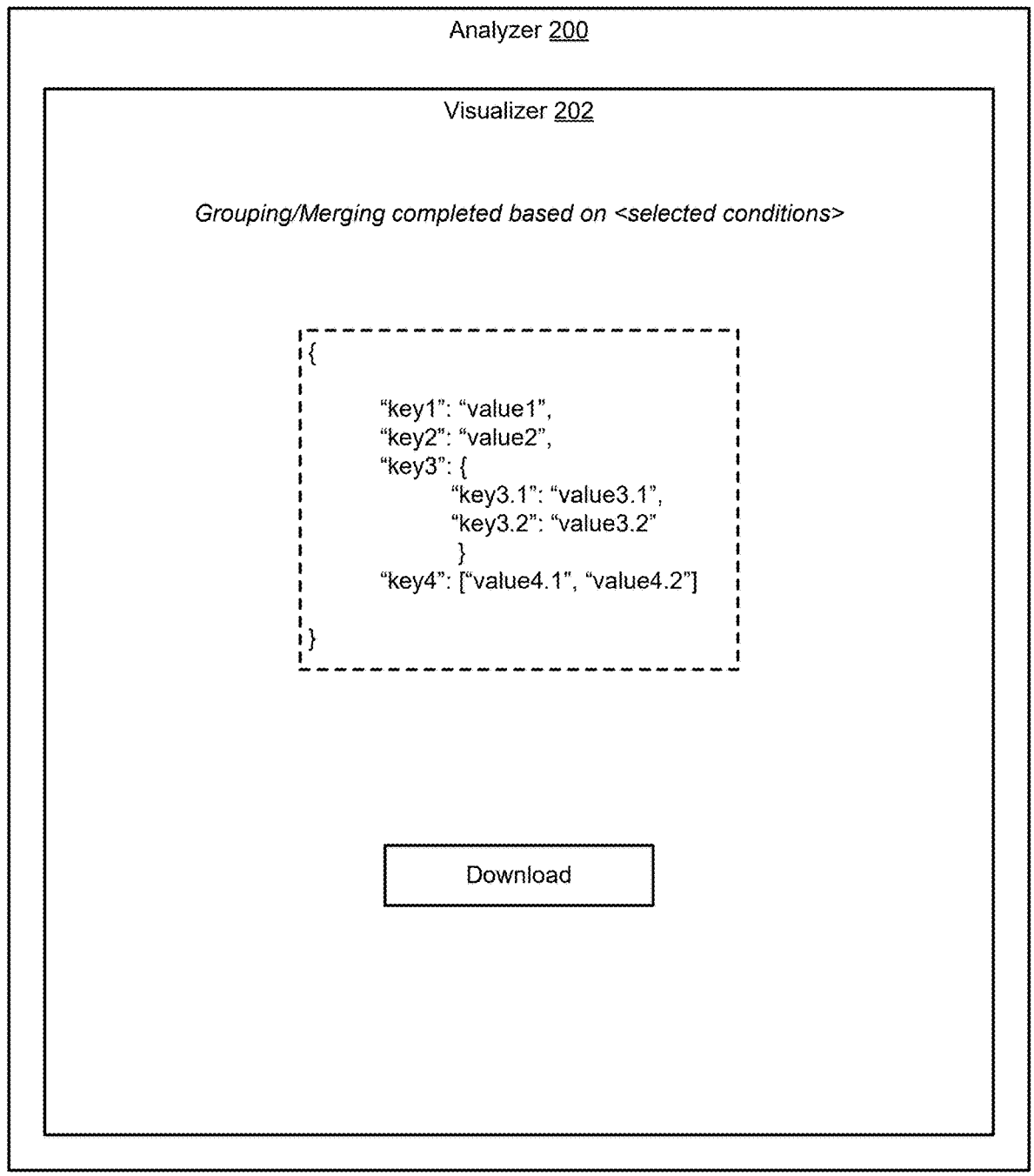
FIG. 2.2

*Example 1 (Merging Criteria = "Key Name" and "Key Structure")*

Sample File #1

```
{
  "storeName": "THL",
  "location": "City Center",
  "laptops": [
    {
      "brand": "BGG",
      "model": "XXYY 13",
      "processor": "A Core i7",
      "ram": "16GB",
      "storage": "512GB SSD",
      "displaySize": "13.3 inches",
      "price": $1299.99,
      "availability": "In Stock"
    },
    {
      "brand": "AGG",
      "model": "ZZ x360",
      "processor": "C 9",
      "ram": "32GB",
      "storage": "1TB SSD",
      "displaySize": "15.6 inches",
      "price": $1599.99,
      "availability": "Out of Stock"
    },
    {
      "brand": "CGG",
      "model": "TT Air",
      "processor": "D1",
      "ram": "8GB",
      "storage": "256GB SSD",
      "displaySize": "13.3 inches",
      "price": $1099.99,
      "availability": "In Stock"
    },
  ]
}
```

FIG. 3.1

*Example 1 (Merging Criteria = "Key Name" and "Key Structure")*

Sample File #2

```
{
"storeName": "THL",
"location": "City Center",
"laptops": [
  {
    "brand": "CGG",
    "model": "TT Air",
    "processor": "D1",
    "ram": "8GB",
    "storage": "256GB SSD",
    "displaySize": "13.3 inches",
    "price": $1099.99,
    "availability": "In Stock"
  },
  {
    "brand": "BGG",
    "model": "XXYY 5th Generation",
    "processor": "A Core i10",
    "ram": "32GB",
    "storage": "1TB SSD",
    "displaySize": "13.3 inches",
    "price": $12999.99,
    "availability": "In Stock"
  },
]
}
```

FIG. 3.2

*Example 1 (Merging Criteria = "Key Name" and "Key Structure")*

Output File

```
{
  "storeName": "THL",
  "location": "City Center",
  "laptops": [
    {
      "brand": "BGG",
      "model": "XXYY 13",
      "processor": "A Core i7",
      "ram": "16GB",
      "storage": "512GB SSD",
      "displaySize": "13.3 inches",
      "price": $1299.99,
      "availability": "In Stock"
    },
    {
      "brand": "AGG",
      "model": "ZZ x360",
      "processor": "C 9",
      "ram": "32GB",
      "storage": "1TB SSD",
      "displaySize": "15.6 inches",
      "price": $1599.99,
      "availability": "Out of Stock"
    },
    {
      "brand": "CGG",
      "model": "TT Air",
      "processor": "D1",
      "ram": "8GB",
      "storage": "256GB SSD",
      "displaySize": "13.3 inches",
      "price": $1099.99,
      "availability": "In Stock"
    },
    {
      "brand": "BGG",
      "model": "XXYY 5$^{th}$ Generation",
      "processor": "A Core i10",
      "ram": "32GB",
      "storage": "1TB SSD",
      "displaySize": "13.3 inches",
      "price": $12999.99,
      "availability": "In Stock"
    },
  ]
}
```

FIG. 3.3

*Example 2 (Merging Criteria = "Key Structure", "Data Type", and "Key Name")*

*Sample File #1*

```
{
  "storeName": "TE",
  "location": "Digital District",
  "laptops": [
    {
      "brand": "BGG",
      "model": "XXYY 15",
      "processor": {
        "manufacturer": "A",
        "model": "Core i9",
        "generation": "11th Gen",
        "quantityAvailable": 100},
      "ram": "32GB",
      "storage": {
        "type": "SSD",
        "capacity": "1TB"},
      "display": {
        "size": "15.6 inches",
        "resolution": "4K OLED"},
      "price": $1999.99,
      "availability": "In Stock",
      "features": [
        "ESX 3080",
        "UUU 4 ports",
        "Backlit keyboard"],
      "customerReviews": [
        {
          "username": "ABC92",
          "rating": 4.5,
          "comment": "Powerful laptop with stunning display, perfect for gaming and work."},
        {
          "username": "RRT",
          "rating": 5.0,
          "comment": "Absolutely amazed by the performance and build quality."},]
    },
```

{
  "brand": "AGG",
  "model": "EE 13",
  "processor": {
    "manufacturer": "C",
    "model": "7",
    "generation": "5000 Series",
    "quantityAvailable": 200},
  "ram": "16GB",
  "storage": {
    "type": "NVMe SSD",
    "capacity": "512GB"},
  "display": {
    "size": "13.3 inches",
    "resolution": "Full HD"},
  "price": $1299.99,
  "availability": "In Stock",
  "features": [
    "Metal chassis",
    "Integrated RR graphics",
    "Fingerprint reader"],
  "customerReviews": []
},
]
}
```

FIG. 4.2

*Example 2 (Merging Criteria = "Key Structure", "Data Type", and "Key Name")*

Sample File #2

```
{
"storeName": "TE",
"location": "Digital District",
"laptops": [
  {
    "brand": "BGG 001",
    "model": "XXYY 15",
    "processor": {
      "manufacturer": "A",
      "model": "Core i9",
      "generation": "11th Gen",
      "quantityAvailable": "five"},
    "ram": "32GB",
    "storage": {
      "type": "SSD",
      "capacity": "1TB"},
    "display": {
      "size": "15.6 inches",
      "resolution": "4K OLED"},
    "price": $1999.99,
    "availability": "In Stock",
    "features": [
      "ESX 3080",
      "UUU 4 ports",
      "Backlit keyboard"],
    "customerReviews": [
      {
        "username": "ABC92",
        "rating": 4.5,
        "comment": "Powerful laptop with stunning display, perfect for gaming and work."},
      {
        "username": "RRT",
        "rating": 5.0,
        "comment": "Absolutely amazed by the performance and build quality."},]
  },
```

{
  "brand": "AGG",
  "model": "EE 13",
  "processor": {
    "manufacturer": "C",
    "model": "7",
    "generation": "5000 Series",
    "quantityAvailable": "ten"},
  "ram": "16GB",
  "storage": {
    "type": "NVMe SSD",
    "capacity": "512GB"},
  "display": {
    "size": "13.3 inches",
    "resolution": "Full HD"},
  "price": $1299.99,
  "availability": "In Stock",
  "features":  [
    "Metal chassis",
    "Integrated RR graphics",
    "Fingerprint reader"],
  "customerReviews":  []
},
]
}
```

FIG. 4.4

*Example 2 (Merging Criteria = "Key Structure", "Data Type", and "Key Name")*

*Output File*

```
{
"storeName": "TE",
"location": "Digital District",
"laptops": [
  {
    "brand": "BGG",
    "model": "XXYY 15",
    "processor": {
      "manufacturer": "A",
      "model": "Core i9",
      "generation": "11th Gen",
      "quantityAvailable": 100},
    "ram": "32GB",
    "storage": {
      "type": "SSD",
      "capacity": "1TB"},
    "display": {
      "size": "15.6 inches",
      "resolution": "4K OLED"},
    "price": $1999.99,
    "availability": "In Stock",
    "features": [
      "ESX 3080",
      "UUU 4 ports",
      "Backlit keyboard"],
    "customerReviews": [
      {
        "username": "ABC92",
        "rating": 4.5,
        "comment": "Powerful laptop with stunning display, perfect for gaming and work."},
      {
        "username": "RRT",
        "rating": 5.0,
        "comment": "Absolutely amazed by the performance and build quality."},]
  },
```

```
{
  "brand": "AGG",
  "model": "EE 13",
  "processor": {
    "manufacturer": "C",
    "model": "7",
    "generation": "5000 Series",
    "quantityAvailable": 200},
  "ram": "16GB",
  "storage": {
    "type": "NVMe SSD",
    "capacity": "512GB"},
  "display": {
    "size": "13.3 inches",
    "resolution": "Full HD"},
  "price": $1299.99,
  "availability": "In Stock",
  "features": [
    "Metal chassis",
    "Integrated RR graphics",
    "Fingerprint reader"],
  "customerReviews": []
},
```

*Example 2 (Merging Criteria = "Key Structure", "Data Type", and "Key Name")*

⋮

```
{
  "brand": "BGG 001",
  "model": "XXYY 15",
  "processor": {
    "manufacturer": "A",
    "model": "Core i9",
    "generation": "11th Gen",
    "quantityAvailable": "five"},
  "ram": "32GB",
  "storage": {
    "type": "SSD",
    "capacity": "1TB"},
  "display": {
    "size": "15.6 inches",
    "resolution": "4K OLED"},
  "price": $1999.99,
  "availability": "In Stock",
  "features": [
    "ESX 3080",
    "Backlit keyboard",
    "Fingerprint reader"],
  "customerReviews": [
    {
      "username": "ABC92",
      "rating": 4.5,
      "comment": "Powerful laptop with stunning display, perfect for gaming and work."},
    {
      "username": "RRT",
      "rating": 5.0,
      "comment": "Absolutely amazed by the performance and build quality."},]
},
```

```
{
  "brand": "AGG",
  "model": "EE 13",
  "processor": {
    "manufacturer": "C",
    "model": "7",
    "generation": "5000 Series",
    "quantityAvailable": "ten"},
  "ram": "16GB",
  "storage": {
    "type": "NVMe SSD",
    "capacity": "512GB"},
  "display": {
    "size": "13.3 inches",
    "resolution": "Full HD"},
  "price": $1299.99,
  "availability": "In Stock",
  "features": [
    "Metal chassis",
    "Integrated RR graphics",
    "Fingerprint reader"],
  "customerReviews":  []
},
]
}
```

FIG. 4.8

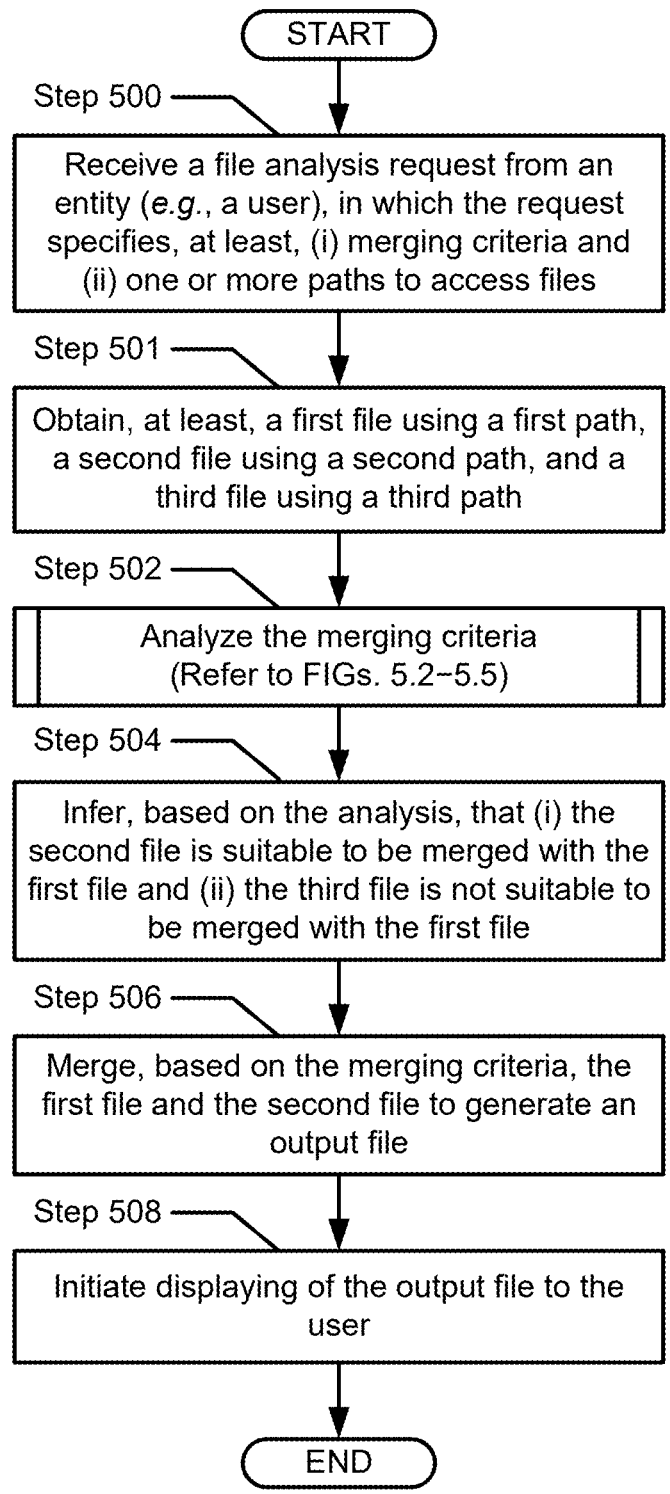
FIG. 5.1

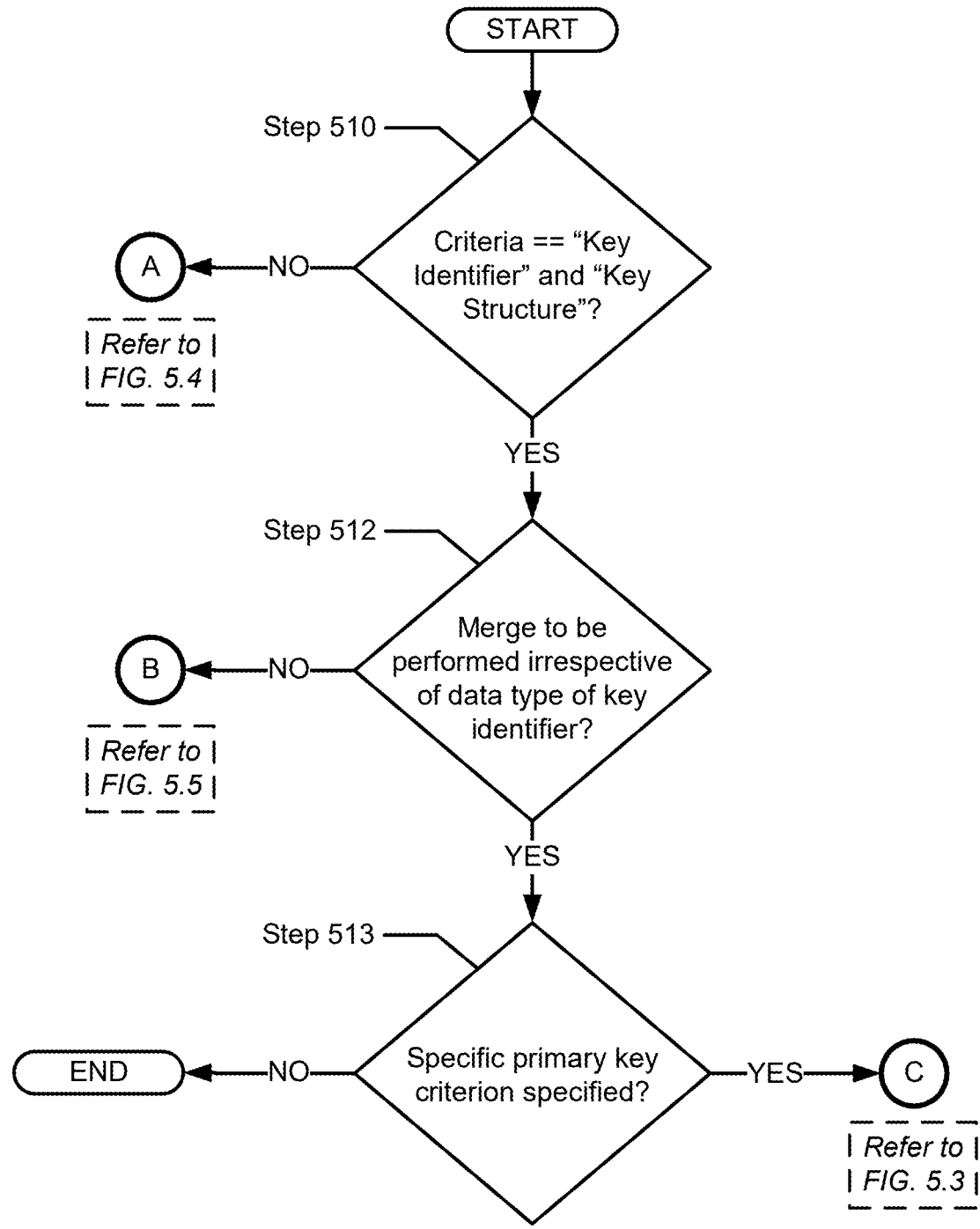
FIG. 5.2

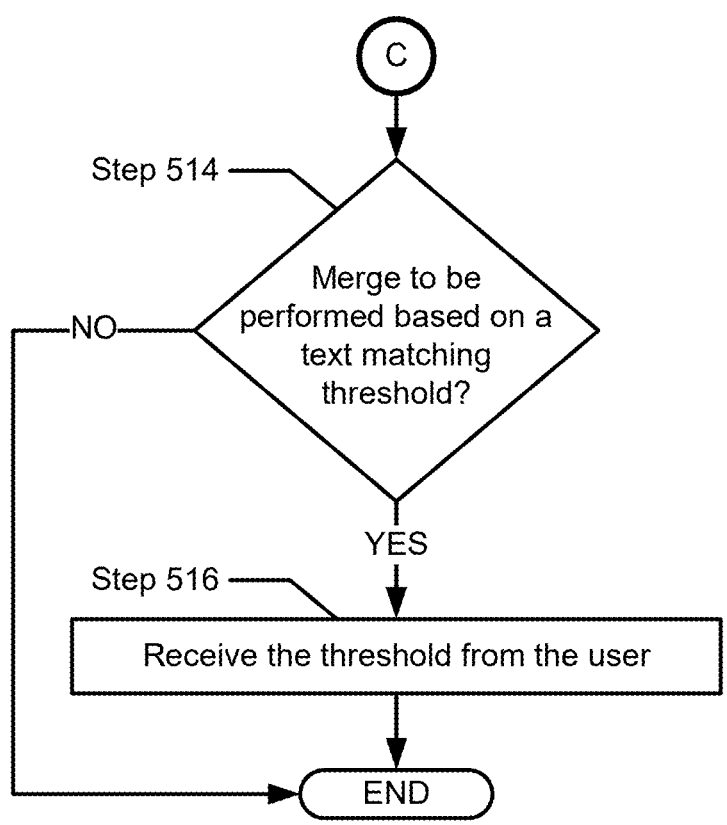
FIG. 5.3

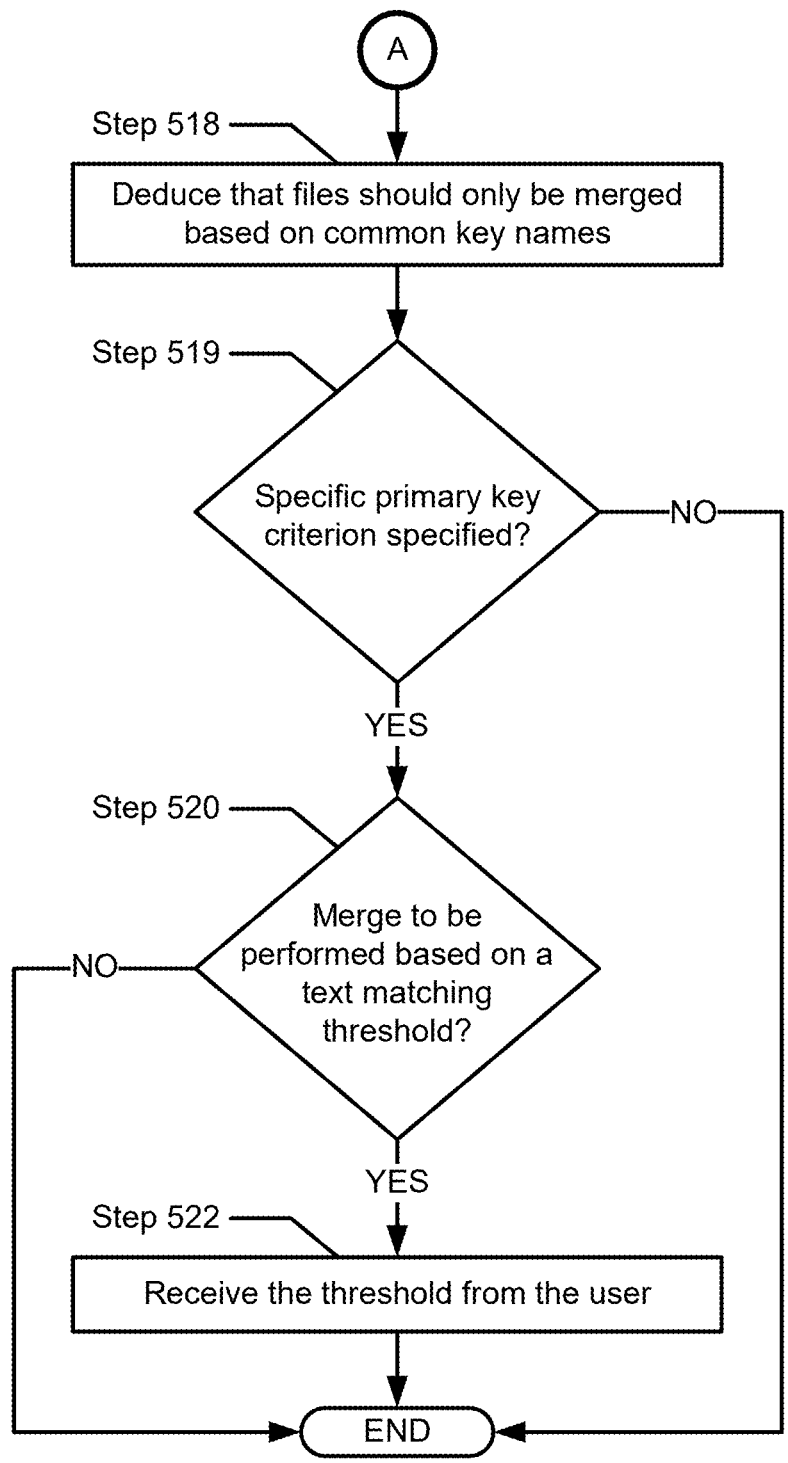
FIG. 5.4

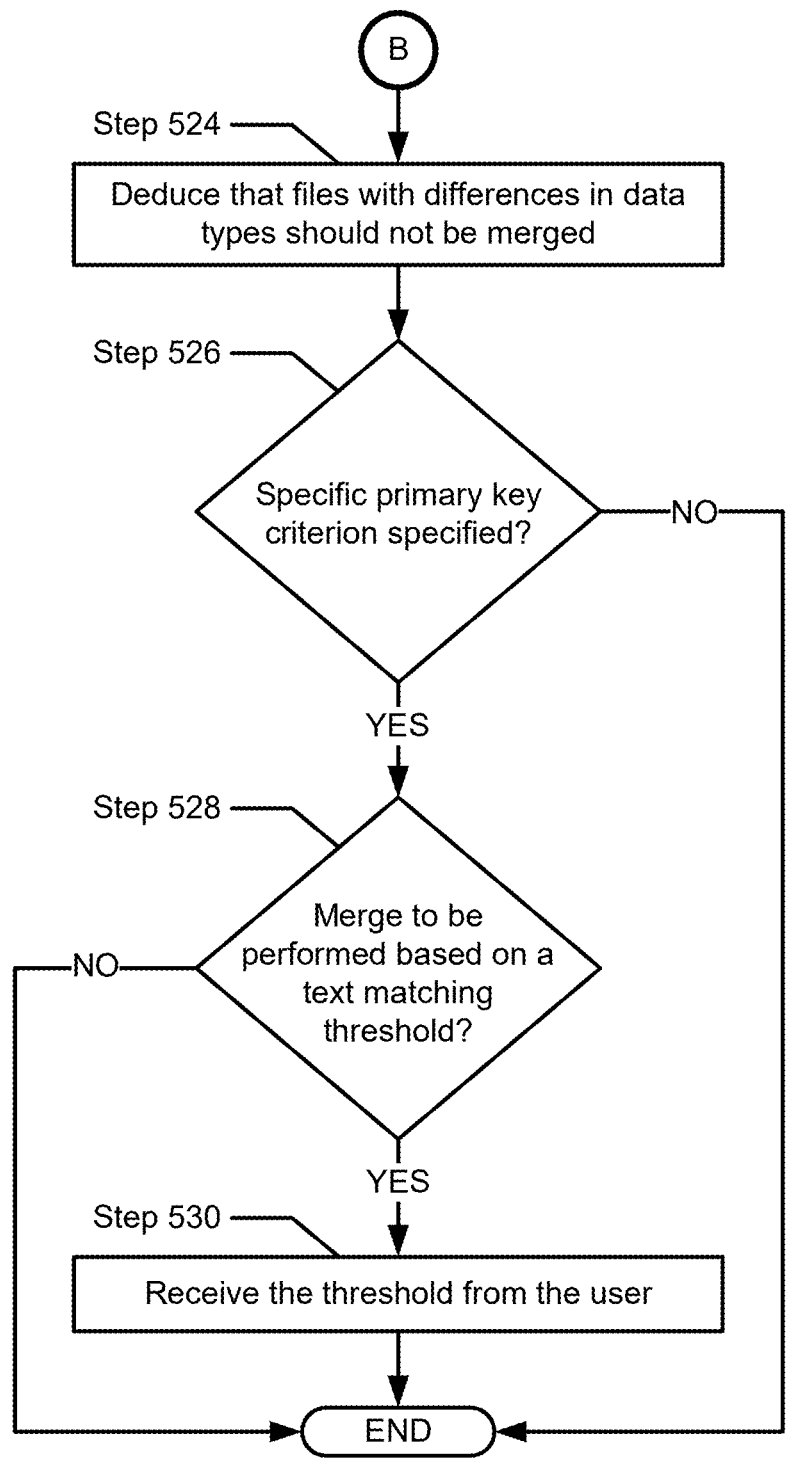
FIG. 5.5

ANALYSIS OF JAVASCRIPT OBJECT NOTATION (JSON) STRUCTURES GENERATED THROUGH VARIOUS SOURCES

BACKGROUND

Devices are often capable of performing certain functionalities that other devices are not configured to perform, or are not capable of performing. In such scenarios, it may be desirable to adapt one or more systems to enhance the functionalities of devices that cannot perform those functionalities.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example, and are not meant to limit the scope of the claims.

FIGS. 2.1-2.2 show a diagram of a visualizer in accordance with one or more embodiments disclosed herein.

FIGS. 3.1-3.3 show an example use case in accordance with one or more embodiments disclosed herein.

FIGS. 4.1-4.8 show an example use case in accordance with one or more embodiments disclosed herein.

FIGS. 5.1-5.5 show a method for managing data in accordance with one or more embodiments disclosed herein.

DETAILED DESCRIPTION

Figure 1:
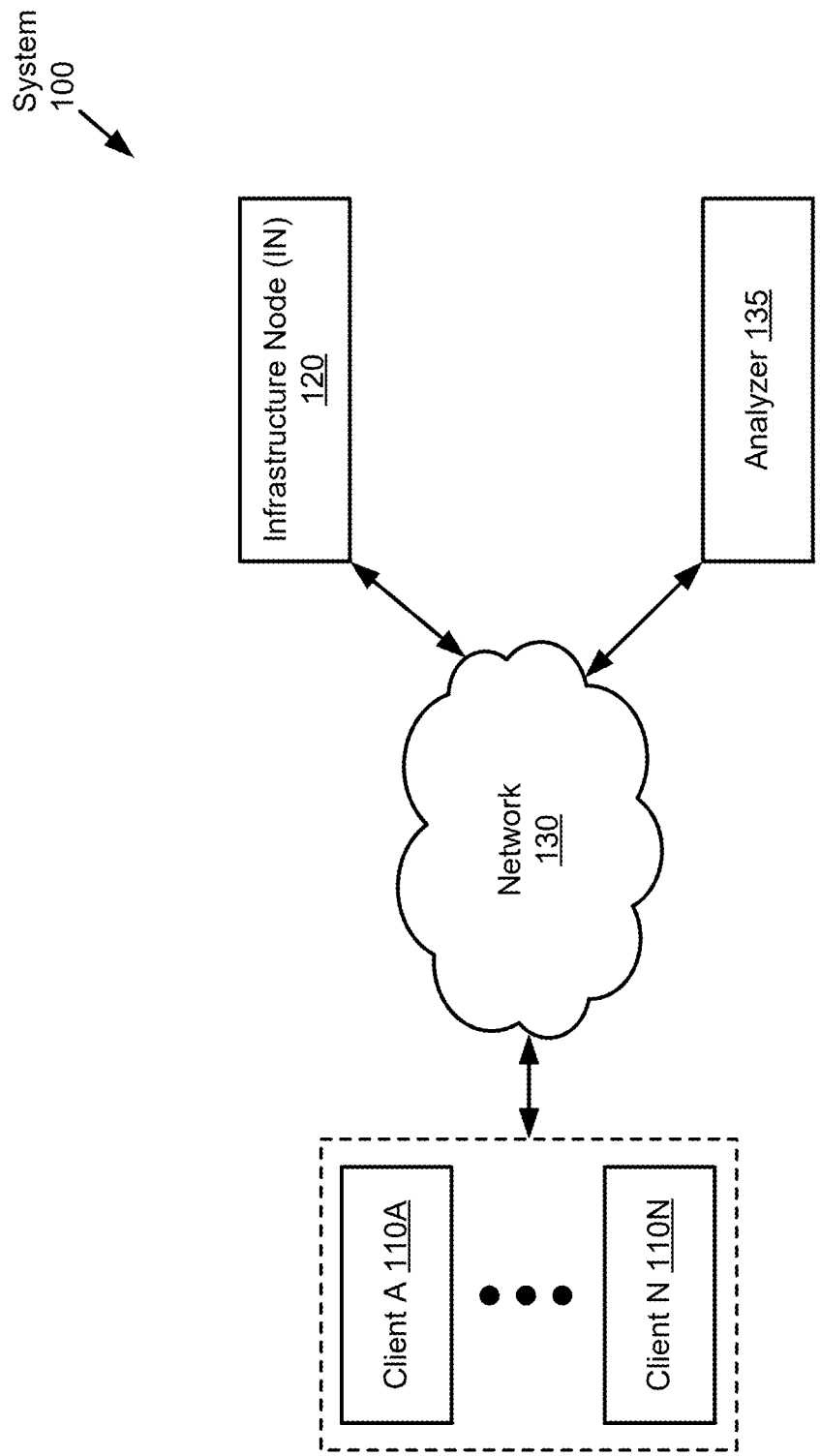
FIG. 1 shows a diagram of a system in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, JSON objects/structures are utilized in various real-world applications for storing and exchanging data. These objects are commonly employed as a data format for web application programming interfaces (APIs), which facilitate retrieving data from remote servers/nodes. JSON structures are also used in configuration files and can represent data for visualization purposes.

However, analyzing JSON objects in data visualization can pose challenges/difficulties because of their nested structures. For example, normalizing data can be difficult because of the nested nature of JSON objects. Additionally, handling JSON-based large datasets can also be challenging because of their size. Some examples of entities/devices/applications that may collect/generate data in a JSON format include: (i) web browsers: web browsers often collect user data in the form of JSON Web Tokens (JWTs), which are used to authenticate and authorize users, (ii) mobile devices: mobile applications usually collect user data (e.g., location data, usage data, device information, etc.) in a JSON format, (iii) Internet of Things (IoT) devices: IoT devices (e.g., smart home devices, security cameras, smart speakers, etc.) often collect data in a JSON format, as this format known as a lightweight and efficient way to transmit data over the Internet, (iv) wearable devices: wearable devices (e.g., fitness trackers, smartwatches, etc.) usually collect user data (e.g., heart rate data, activity data, sleep data, etc.) in a JSON format, and (v) server logs: servers that host websites and/or web applications usually collect user data in a JSON format as server logs, which can include information such as Internet Protocol (IP) addresses, user details, and timestamps.

Analyzing and defining relationships between JSON objects generated/collected by the aforementioned entities/devices/applications is a complex and time consuming task that requires an understanding of a related entity's data model and the context in which corresponding data is generated. For example, a data analyst may need to take following steps to analyze and define relationships between JSON objects: (i) understand a source data model and data types: as a first step, the analyst may need to understand the data model used by different entities/sources, which may involve understanding the structure of JSON objects (e.g., key-value pairs) generated by each source/device, as well as the meaning of data fields specified in the JSON objects, (ii) identify common attributes: once the data model is understood and as a second step, the analyst may begin to identify one or more common attributes that are shared across multiple JSONs (e.g., JSON objects, JSON files, etc.) (for example, if a related device generates JSONs that represent sensor readings, the analyst may need to search for common attributes such as a sensor type and a timestamp), (iii) define data relationships by analyzing the JSON structure: as a third step and with the common attributes identified, the analyst may define relationships between the JSON objects based on the common attributes (for example, if two JSON files share the same sensor type and timestamp, these files may be related and can be merged for further analysis), (iv) use context to refine relationships: as a fourth step and in some cases, the context (in which data is generated) may help the analyst to refine relationships between JSON files (for example, if a corresponding device is a smart home thermostat, the analyst may consider relationships between JSON files based on a room that the thermostat is located, as well as the time of day and day of the week), and (v) test and iterate: defining relationships between JSON files may be an iterative process (that may require testing and refinement) and, as a fifth step, the analyst may need to adjust his/her approach based on insights obtained from analyzing data and may need to revisit earlier steps as the analyst grasp a deeper understanding of the data.

For at least the reasons discussed above and without requiring resource-intensive efforts (e.g., time, engineering, etc.), a fundamentally different approach/framework is needed (e.g., a framework (e.g., an automation tool) that makes easy to analyze JSON data/files generated by various sources so that users/administrators/analysts can quickly and easily visualize JSON data and define relationships between JSON files based on user-defined parameters/criteria (with respect to, for example, JSON structure, key-value pair, data type, etc.)).

Embodiments disclosed herein relate to methods and systems for managing data. As a result of the processes discussed below, one or more embodiments disclosed herein advantageously ensure that (at least, for example, for a better user experience): (i) the framework provides a flexible and customizable way to analyze JSON data, in which a user may choose to analyze the JSON data based on one or more user-defined parameters, and the framework further provides real-time visualizations of the data as the user explores different combinations of the parameters; (ii) with its advanced analytics capabilities, the framework assists users in identifying patterns and trends in diverse JSON data that may get missed otherwise (and because the framework is an automated framework, user can save time and reduce the risk of errors when analyzing the JSON data from various sources); (iii) the framework enables different user groups/communities (e.g., data analysts, data scientists, IoT Engineers, etc.) to perform an efficient analysis of JSON data generated by various sources; (iv) the framework enables/allows users to define their own criteria (e.g., user-defined parameters) for analyzing JSON data based on factors such as, for example, JSON structure, key-value pair, data type, etc. (which provides a high-level of flexibility to users for analyzing JSON data based on their specific needs); (v) the framework reduces data anomalies within JSON data to make the data more consistent (which can save time and reduce the risk of errors in the data, as users can quickly identify the impact of different criteria on the data for which the users had to spend a lot of time to analyze); (vi) the framework provides automated relationship definition and referential integrity between JSON objects/files, in which the framework automates the process of defining relationships between JSON files based on common attributes (e.g., key-value pairs, data types, etc.) towards saving on computing resources for data analysis (and minimizing data analysis time) and reducing the risk of errors during analysis (as users may not have time and computing resources to manually search for relationships between JSON files); (vii) the framework is a user-friendly tool and is accessible to a wide range of users, so that any type of user can easily get started with analyzing his/her JSON data and unlocking insights from different sources/devices (e.g., IoT devices); and/or (viii) by analyzing diverse JSON data, the framework assists users (and/or organizations) to make more informed and data-driven decisions towards improving operational efficiency, reducing costs, and increasing revenue.

The following describes various embodiments disclosed herein.

FIG. 1 shows a diagram of a system (100) in accordance with one or more embodiments disclosed herein. The system (100) includes any number of clients (e.g., Client A (110A), Client N (110N), etc.), a network (130), any number of infrastructure nodes (INs) (e.g., 120), and an analyzer (135). The system (100) may include additional, fewer, and/or different components without departing from the scope of the embodiments disclosed herein. Each component may be operably/operatively connected to any of the other components via any combination of wired and/or wireless connections. Each component illustrated in FIG. 1 is discussed below.

In one or more embodiments, the clients (e.g., 110A, 110N, etc.), the IN (120), the network (130), and the analyzer (135) may be (or may include) physical hardware or logical devices, as discussed below. While FIG. 1 shows a specific configuration of the system (100), other configurations may be used without departing from the scope of the embodiments disclosed herein. For example, although the clients (e.g., 110A, 110N, etc.) and the IN (120) are shown to be operatively connected through a communication network (e.g., 130), the clients (e.g., 110A, 110N, etc.) and the IN (120) may be directly connected (e.g., without an intervening communication network).

Further, the functioning of the clients (e.g., 110A, 110N, etc.) and the IN (120) is not dependent upon the functioning and/or existence of the other components (e.g., devices) in the system (100). Rather, the clients and the IN may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job. As used herein, the term "data" is intended to be broad in scope. In this manner, that term embraces, for example (but not limited to): a data stream (or stream data), data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment) and may deliver at least computing power (e.g., real-time (on the order of milliseconds (ms) or less) network monitoring, server virtualization, etc.), storage capacity (e.g., data backup), and data protection (e.g., software-defined data protection, disaster recovery, etc.) as a service to users of clients (e.g., 110A, 110N, etc.). For example, the system may be configured to organize unbounded, continuously generated data into a data stream. The system (100) may also represent a comprehensive middleware layer executing on computing devices (e.g., 600, FIG. 6) that supports application and storage environments.

In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using the clients (e.g., 110A, 110N, etc.)) and other computations remotely (e.g., away from the users' site using the IN (120)) from the users. By doing so, the users may utilize different computing devices (e.g., 600, FIG. 6) that have different quantities of computing resources (e.g., processing cycles, memory, storage, etc.) while still being afforded a consistent user experience. For example, by performing some computations remotely, the system (100) (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user/customer of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, a client (e.g., 110A, 110N, etc.) may include functionality to, e.g.: (i) capture sensory input (e.g., sensor data) in the form of text, audio, video, touch or motion, (ii) collect massive amounts of data at the edge of an IoT network (where, the collected data may be grouped as: (a) data that needs no further action and does not need to be stored, (b) data that should be retained for later analysis and/or record keeping, and (c) data that requires an immediate action/response), (iii) provide to other entities (e.g., the IN (120)), store, or otherwise utilize captured sensor data (and/or any other type and/or quantity of data), and (iv) provide surveillance services (e.g., determining object-level information, performing face recognition, etc.) for scenes (e.g., a physical region of space). One of ordinary skill will appreciate that the client may perform other functionalities without departing from the scope of the embodiments disclosed herein.

In one or more embodiments, the clients (e.g., 110A, 110N, etc.) may be geographically distributed devices (e.g., user devices, front-end devices, etc.) and may have relatively restricted hardware and/or software resources when compared to the IN (120). As being, for example, a sensing device, each of the clients may be adapted to provide monitoring services. For example, a client may monitor the state of a scene (e.g., objects disposed in a scene). The monitoring may be performed by obtaining sensor data from sensors that are adapted to obtain information regarding the scene, in which a client may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors. The sensor may be, for example (but not limited to): a visual sensor (e.g., a camera adapted to obtain optical information (e.g., a pattern of light scattered off of the scene) regarding a scene/environment), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, a global positioning system sensor, a biological sensor, a differential pressure sensor, a corrosion sensor, etc.

In one or more embodiments, the clients (e.g., 110A, 110N, etc.) may be physical or logical computing devices configured for hosting one or more workloads, or for providing a computing environment whereon workloads may be implemented. The clients may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the clients). The clients (e.g., 110A, 110N, etc.) may correspond to computing devices that one or more users use to interact with one or more components of the system (100).

In one or more embodiments, a client (e.g., 110A, 110N, etc.) may represent a physical appliance or computing device operated by one or more individuals of (or employed by) an organization. Examples of said individual(s) may include, but not limited to, any organization executive(s) (e.g., chief executive officer (CEO), chief financial officer (CFO), etc.) and any employee(s) in the data management team of the organization (e.g., an administrator). Further, the organization may refer to any enterprise at least engaged in for-profit commercial, industrial, or professional activities.

In one or more embodiments, a client (e.g., 110A, 110N, etc.) may include any number of applications (and/or content accessible through the applications) that provide computer-implemented services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

Applications may vary in different embodiments, but in certain embodiments, applications may be custom developed or commercial (e.g., off-the-shelf) applications that a user desires to execute in a client (e.g., 110A, 110N, etc.). In one or more embodiments, applications may be logical entities executed using computing resources of a client. For example, applications may be implemented as computer instructions stored on persistent storage of the client that when executed by the processor(s) of the client, cause the client to provide the functionality of the applications described throughout the application.

In one or more embodiments, while performing, for example, one or more operations requested by a user, applications installed on a client (e.g., 110A, 110N, etc.) may include functionality to request and use physical and logical resources of the client. Applications may also include functionality to use data stored in storage/memory resources of the client. The applications may perform other types of functionalities not listed above without departing from the scope of the embodiments disclosed herein. While providing application services to a user, applications may store data that may be relevant to the user in storage/memory resources of the client.

In one or more embodiments, to provide services to the users, the clients (e.g., 110A, 110N, etc.) may utilize, rely on, or otherwise cooperate with the IN (120). For example, the clients may issue requests to the IN to receive responses and interact with various components of the IN. The clients may also request data from and/or send data to the IN (for example, the clients may transmit information to the IN that allows the IN to perform computations, the results of which are used by the clients to provide services to the users). As yet another example, the clients may utilize computer-implemented services provided by the IN. When the clients interact with the IN, data that is relevant to the clients may be stored (temporarily or permanently) in the IN.

In one or more embodiments, a client (e.g., 110A, 110N, etc.) may be capable of, e.g.: (i) collecting users' inputs, (ii) correlating collected users' inputs to the computer-implemented services to be provided to the users, (iii) communicating with the IN (120) that perform computations necessary to provide the computer-implemented services, (iv) using the computations performed by the IN to provide the computer-implemented services in a manner that appears (to the users) to be performed locally to the users, and/or (v) communicating with any virtual desktop (VD) in a virtual desktop infrastructure (VDI) environment (or a virtualized architecture) provided by the IN (using any known protocol in the art), for example, to exchange remote desktop traffic or any other regular protocol traffic (so that, once authenticated, users may remotely access independent VDs).

As described above, the clients (e.g., 110A, 110N, etc.) may provide computer-implemented services to users (and/or other computing devices). The clients may provide any number and any type of computer-implemented services. To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high-speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the clients (e.g., 110A, 110N, etc.) provide computer-implemented services to users, the clients may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., 110A, 110N, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the embodiments disclosed herein.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface a client with external entities (e.g., the IN (120)) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients (e.g., 110A, 110N, etc.). For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 110A, 110N, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client, cause the client to provide the functionality of the hypervisor.

In one or more embodiments, a client (e.g., 110A, 110N, etc.) may be, for example (but not limited to): a physical computing device, a smartphone, a tablet, a wearable, a gadget, a closed-circuit television (CCTV) camera, a music player, a game controller, etc. Different clients may have different computational capabilities. In one or more embodiments, Client A (110A) may have 16 gigabytes (GB) of dynamic RAM (DRAM) and 1 CPU with 12 cores, whereas Client N (110N) may have 8 GB of PMEM and 1 CPU with 16 cores. Other different computational capabilities of the clients not listed above may also be taken into account without departing from the scope of the embodiments disclosed herein.

Figure 6:
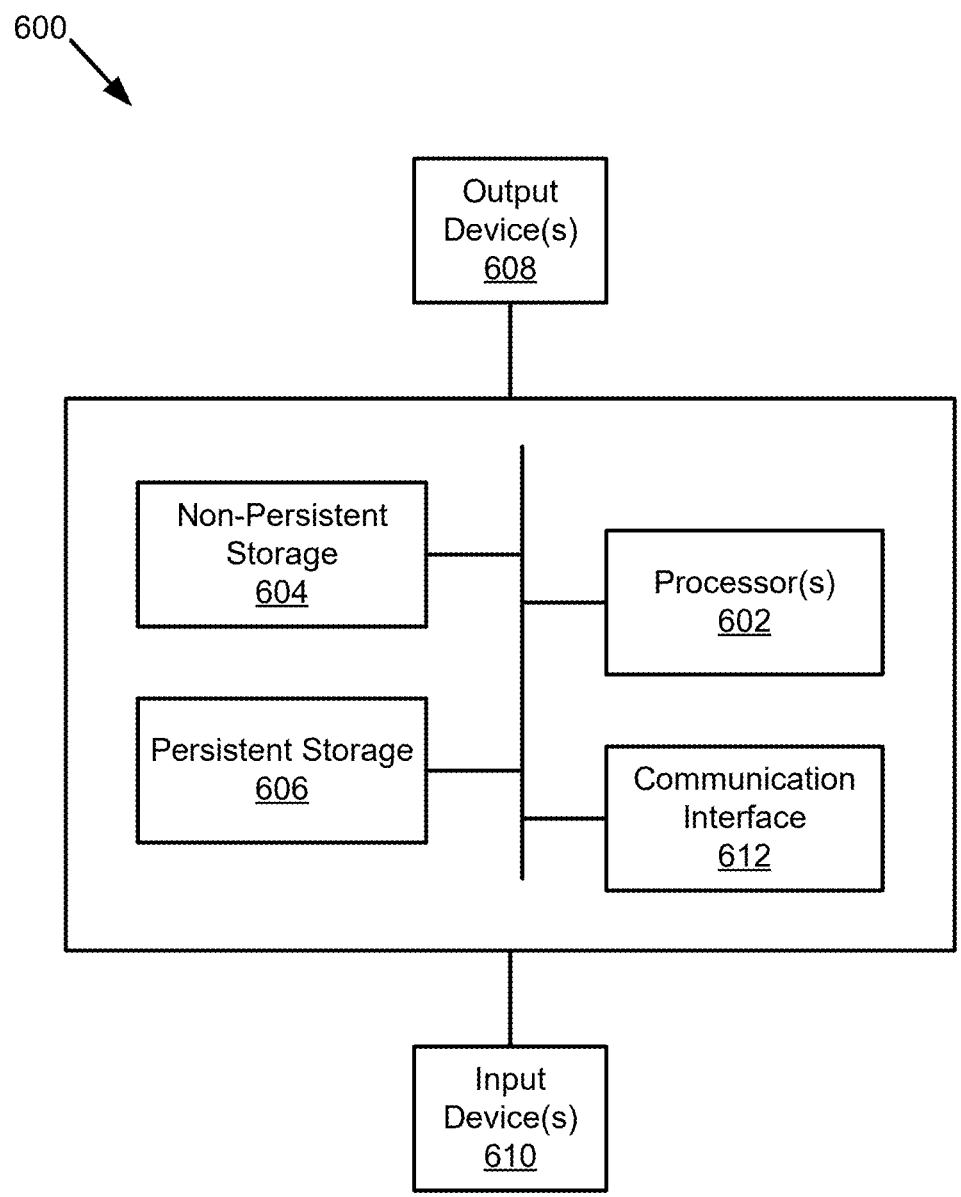
FIG. 6 shows a diagram of a computing device in accordance with one or more embodiments disclosed herein.

Further, in one or more embodiments, a client (e.g., 110A, 110N, etc.) may be implemented as a computing device (e.g., 600, FIG. 6). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

Alternatively, in one or more embodiments, the client (e.g., 110A, 110N, etc.) may be implemented as a logical device (e.g., a VM). The logical device may utilize the computing resources of any number of computing devices to provide the functionality of the client described throughout this application.

In one or more embodiments, users (e.g., customers, administrators, organization executives, etc.) may interact with (or operate) the clients (e.g., 110A, 110N, etc.) in order to perform work-related tasks (e.g., production workloads). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing the virtualization technology. In one or more embodiments, an administrator may be a user/person/human with permission (e.g., a user that has root-level access) to make changes on the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 600, FIG. 6) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, the IN (120) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, the IN (120) may include functionality to, e.g.: (i) obtain (or receive) data (e.g., any type and/or quantity of input) from any source (and, if necessary, aggregate the data); (ii) perform complex analytics and analyze data that is received from one or more clients (e.g., 110A, 110N, etc.) to generate additional data that is derived from the obtained data without experiencing any middleware and hardware limitations; (iii) provide meaningful information (e.g., a response) back to the corresponding clients; (iv) filter data (e.g., received from a client) before pushing the data (and/or the derived data) to a database (not shown) for management of the data and/or for storage of the data (while pushing the data, the IN may include information regarding a source of the data (e.g., an identifier of the source) so that such information may be used to associate provided data with one or more of the users (or data owners)); (v) host and maintain various workloads; (vi) provide a computing environment whereon workloads may be implemented (e.g., employing linear, non-linear, and/or machine learning (ML) models to perform cloud-based data processing); (vii) incorporate strategies (e.g., strategies to provide VDI capabilities) for remotely enhancing capabilities of the clients; (viii) provide robust security features to the clients and make sure that a minimum level of service is always provided to a user of a client; (ix) transmit the result(s) of the computing work performed (e.g., real-time business insights, equipment maintenance predictions, other actionable responses, etc.) to another IN (not shown) for review and/or other human interactions; (x) exchange data with other devices registered in/to the network (130) in order to, for example, participate in a collaborative workload placement (e.g., the node may split up a request (e.g., an operation, a task, an activity, etc.) with another IN, coordinating its efforts to complete the request more efficiently than if the IN had been responsible for completing the request); (xi) provide software-defined data protection for the clients (e.g., 110A, 110N, etc.); (xii) provide automated data discovery, protection, management, and recovery operations for the clients; (xiii) monitor operational states of the clients; (xiv) regularly back up configuration information of the clients to the database; (xv) provide (e.g., via a broadcast, multicast, or unicast mechanism) information (e.g., a location identifier, the amount of available resources, etc.) associated with the IN to other INs of the system (100); (xvi) configure or control any mechanism that defines when, how, and what data to provide to the clients and/or database; (xvii) provide data deduplication; (xviii) orchestrate data protection through one or more GUIs; (xix) empower data owners (e.g., users of the clients) to perform self-service data backup and restore operations from their native applications; (xx) ensure compliance and satisfy different types of service level objectives (SLOs) set by an administrator/user; (xxi) increase resiliency of an organization by enabling rapid recovery or cloud disaster recovery from cyber incidents; (xxii) provide operational simplicity, agility, and flexibility for physical, virtual, and cloud-native environments; (xxiii) consolidate multiple data process or protection requests (received from, for example, clients) so that duplicative operations (which may not be useful for restoration purposes) are not generated; (xxiv) initiate multiple data process or protection operations in parallel (e.g., an IN may host multiple operations, in which each of the multiple operations may (a) manage the initiation of a respective operation and (b) operate concurrently to initiate multiple operations); and/or (xxv) manage operations of one or more clients (e.g., receiving information from the clients regarding changes in the operation of the clients) to improve their operations (e.g., improve the quality of data being generated, decrease the computing resources cost of generating data, etc.). In one or more embodiments, in order to read, write, or store data, the IN (120) may communicate with, for example, the database and/or other storage devices in the system (100).

As described above, the IN (120) may be capable of providing a range of functionalities/services to the users of the clients (e.g., 110A, 110N, etc.). However, not all of the users may be allowed to receive all of the services. To manage the services provided to the users of the clients, a system (e.g., a service manager) in accordance with embodiments disclosed herein may manage the operation of a network (e.g., 130), in which the clients are operably connected to the IN. Specifically, the service manager (i) may identify services to be provided by the IN (for example, based on the number of users using the clients) and (ii) may limit communications of the clients to receive IN provided services.

For example, the priority (e.g., the user access level) of a user may be used to determine how to manage computing resources of the IN (120) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a non-privileged user, a user with a user access level/tier of 4/10). In such a scenario, the user level of that user may indicate that certain ports (of the subcomponents of the network (130) corresponding to communication protocols such as the TCP, the UDP, etc.) are to be opened, other ports are to be blocked/disabled so that (i) certain services are to be provided to the user by the IN (120) (e.g., while the computing resources of the IN may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (e.g., 110A, 110N, etc.) may be granularly configured without modifying the operation(s) of the clients and (ii) the overhead for managing the services of the clients may be reduced by not requiring modification of the operation(s) of the clients directly.

In contrast, a second user may be determined to be a high-priority user (e.g., a privileged user, a user with a user access level of 9/10). In such a case, the user level of that user may indicate that more ports are to be opened than were for the first user so that (i) the IN (120) may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, operating system (OS) data, etc.), medium workloads with higher priority (e.g., VM with FS data, network data management protocol (NDMP) data, etc.), large workloads with critical priority (e.g., mission critical application data), etc.

Further, while a single IN (e.g., 120) is considered above, the term "node" includes any collection of systems or sub-systems that individually or jointly execute a set, or multiple sets, of instructions to provide one or more computer-implemented services. For example, a single IN may provide a computer-implemented service on its own (i.e., independently) while multiple other nodes may provide a second computer-implemented service cooperatively (e.g., each of the multiple other nodes may provide similar and or different services that form the cooperatively provided service).

As described above, the IN (120) may provide any quantity and any type of computer-implemented services. To provide computer-implemented services, the IN may be a heterogeneous set, including a collection of physical components/resources (discussed above) configured to perform operations of the node and/or otherwise execute a collection of logical components/resources (discussed above) of the node.

In one or more embodiments, the IN (120) may implement a management model to manage the aforementioned computing resources in a particular manner. The management model may give rise to additional functionalities for the computing resources. For example, the management model may automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and number of management models may be implemented to provide additional functionalities using the computing resources without departing from the scope of the embodiments disclosed herein.

One of ordinary skill will appreciate that the IN (120) may perform other functionalities without departing from the scope of the embodiments disclosed herein.

In one or more embodiments, the IN (120) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the IN described throughout the application.

Alternatively, in one or more embodiments, similar to a client (e.g., 110A, 110N, etc.), the IN (120) may also be implemented as a logical device.

Referring to FIG. 1, the analyzer (135) is demonstrated as a separate component (e.g., a separate computing device) in the system (100); however, embodiments disclosed herein are not limited as such. The analyzer (135) may be demonstrated as deployed to the IN (120) (e.g., as part of the IN (120)).

As used herein, a JSON format may be considered as an ideal format for representing larger data that have a hierarchical structured relationship. A JSON object may include zero, one, or more key-value pairs (also called as "properties"). The object may be surrounded by curly braces "{ }" (said another way, curly braces may hold objects) and each key-value pair (e.g., each data object) may be separated by a comma ",". Further, square brackets "[ ]" may hold arrays. In one or more embodiments, in a given JSON object, an order of a key-value pair may not be important. A value (of a related key-value pair) may be any data type, for example (but not limited to): string (surrounded by quotation marks), number, float, array (e.g., a JSON array), object (e.g., a nested JSON object), Boolean (e.g., true or false), empty/null, etc.

For example, the data illustrated in FIG. 2.2 is nested and structured data, in which each data element include a particular object name (e.g., key1 (e.g., a key name/identifier of a related key), key2, key3, and key4). "value" is the value of "key1" key. Similarly, "value2" is the value of "key2" key, the value of "key3" holds "key3.1": "value3.1", "key3.2": "value3.2" objects, and the value of "key4" key holds ["value4.1", "value4.2"] array.

In one or more embodiments, A={object1, object2, ..., objectn} may be an original set of JSON objects in which "n" is the total number of original set of JSON objects. X may represent user-defined "grouping" parameters/criteria, which may be based on (i) a key of one or more JSON objects or (ii) a data type of the key (of the JSON objects). B={object'1, object'2, ..., object'n} may be the resultant subgrouped JSON object set/obtained by merging A on X, in which "M" is the number of JSON objects in B. In one or more embodiments, changing X (by a corresponding user) may result in other subgroups (e.g., C, D, etc.) of JSON objects and (M1, M2, M3, ..., Mn) may be the count/number of JSON objects in each subgroups. As the grouping progresses multiple times in order to normalize JSON objects, the resultant number of JSON objects may be reduced (i.e., M<=n).

In one or more embodiments, the analyzer (135) may perform the grouping/merging (e.g., grouping of JSON objects, grouping of JSON files, etc.) based on the following, e.g.: (i) start parsing "n" number of JSON objects denoted as A={object1, object2, ..., objectn}; (ii) define "X" to be one or more of the following conditions: (a) an identifier/name of a key, (b) a data type of the key, and (c) a structure of the key; (iii) merge the values of the JSON objects for selected "X" conditions (that are part of user-defined parameters/criteria), resulting in a reduced set of JSON subsets (denoted as B={object'1, object'2, ..., object'n} with "M" number of objects); and/or (iv) if further grouping is required based on the grouping criteria/conditions defined in (ii), parse the JSON objects (or JSON object sets) from (iii) for commonality, which results in a further reduced set, denoted as C={object"1, object"2, . . . , object"q} with "q" being the number of objects.

In one or more embodiments, the analyzer (135) may host a visualizer (e.g., 202, FIG. 2.1). Additional functionalities of the analyzer (135) are discussed below in reference to FIGS. 5.1-5.5.

In one or more embodiments, the analyzer (135) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the analyzer described throughout the application.

Alternatively, in one or more embodiments, similar to a client (e.g., 110A, 110N, etc.), the analyzer (135) may also be implemented as a logical device.

In one or more embodiments, all, or a portion, of the components of the system (100) may be operably connected each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., the clients, the IN, etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network may be operably connected to the Internet or other networks. Further, the network (130) may enable interactions between, for example, the clients and the IN through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VOIP), etc.

Turning now to the database (discussed/mentioned above), the database may provide long-term, durable, high read/write throughput data storage/protection with near-infinite scale and low-cost. The database may be a fully managed cloud/remote (or local) storage (e.g., cold tier storage, pluggable storage, object storage, block storage, file system storage, data stream storage, Web servers, unstructured storage, etc.) that acts as a shared storage/memory resource that is functional to store unstructured and/or structured data. Further, the database may also occupy a portion of a physical storage/memory device or, alternatively, may span across multiple physical storage/memory devices.

In one or more embodiments, the database may be implemented using physical devices that provide data storage services (e.g., storing data and providing copies of previously stored data). The devices that provide data storage services may include hardware devices and/or logical devices. For example, the database may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the database may include a memory device (e.g., a dual in-line memory device), in which data is stored and from which copies of previously stored data are provided. As yet another example, the database may include a persistent storage device (e.g., an SSD), in which data is stored and from which copies of previously stored data is provided. As yet another example, the database may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the database may store/record unstructured and/or structured data that may include (or specify), for example (but not limited to): an identifier of a user/customer (e.g., a unique string or combination of bits associated with a particular user); a request received from a user (or a user's account); a geographic location (e.g., a country) associated with the user; a timestamp showing when a specific request is processed by an application; a port number (e.g., associated with a hardware component of a client (e.g., 110A)); a protocol type associated with a port number; computing resource details (including details of hardware components and/or software components) and an IP address of an IN (e.g., 120) hosting an application where a specific request is processed; an identifier of an application (e.g., that is deployed by a manufacturer to the database); information with respect to historical metadata (e.g., system logs, applications logs, telemetry data including past and present device usage of one or more computing devices in the system (100), etc.); computing resource details and an IP address of a client that sent a specific request (e.g., to the IN (120)); one or more points-in-time and/or one or more periods of time associated with a data recovery event; data for execution of applications/services (including IN applications and associated end-points); corpuses of annotated data used to build/generate and train processing classifiers for trained ML models; linear, non-linear, and/or ML model parameters (e.g., instructions to the analyzer (135) on how to train and/or fine-tune a model); an identifier of a sensor; a product identifier of a client (e.g., 110A); a type of a client; historical sensor data/input (e.g., visual sensor data, audio sensor data, electromagnetic radiation sensor data, temperature sensor data, humidity sensor data, corrosion sensor data, etc., in the form of text, audio, video, touch, and/or motion) and its corresponding details; an identifier of a data item; a size of the data item; a distributed model identifier that uniquely identifies a distributed model; a user activity performed on a data item; a cumulative history of user/administrator activity records obtained over a prolonged period of time; a setting (and a version) of a mission critical application executing on an IN (e.g., 120); an SLA/SLO set by a user; a data protection policy (e.g., an affinity-based backup policy) implemented by a user (e.g., to protect a local data center, to perform a rapid recovery, etc.); a configuration setting of that policy; product configuration information associated with a client; a number of each type of a set of assets protected by an IN (e.g., 120); a size of each of the set of assets protected; a number of each type of a set of data protection policies implemented by a user; configuration information associated with the analyzer (135); a job detail of a job (e.g., a data protection job, a data restoration job, a log retention job, etc.) that has been initiated by an IN (e.g., 120); a type of the job (e.g., a non-parallel processing job, a parallel processing job, an analytics job, etc.); information associated with a hardware resource set (discussed below) of the IN (120); a completion timestamp encoding a date and/or time reflective of a successful completion of a job; a time duration reflecting the length of time expended for executing and completing a job; a backup retention period associated with a data item; a status of a job (e.g., how many jobs are still active, how many jobs are completed, etc.); a number of requests handled (in parallel) per minute (or per second, per hour, etc.) by the analyzer; a number of errors encountered when handling a job; a documentation that shows how the analyzer performs against an SLO and/or an SLA; information regarding an administrator (e.g., a high-priority trusted administrator, a low-priority trusted administrator, etc.) related to an analytics job; a workflow (e.g., a policy that dictates how a workload should be configured and/or protected, such as a structured query language (SQL) workflow dictates how an SQL workload should be protected) set (by a user); a type of a workload that is tested/validated by an administrator per data protection policy; a practice recommended by a vendor (e.g., a single data protection policy should not protect more than 100 assets; for a dynamic NAS, maximum one billion files can be protected per day, etc.); one or more device state paths corresponding to a device (e.g., a client); an existing knowledge base (KB) article; a technical support history documentation of a customer/user; a port's user guide; a port's release note; a community forum question and its associated answer; a catalog file of an application upgrade; details of a compatible OS version for an application upgrade to be installed; an application upgrade sequence; a solution or a workaround document for a software failure; one or more lists that specify which computer-implemented services should be provided to which user (depending on a user access level of a user); a fraud report for an invalid user; a set of SLAs (e.g., an agreement that indicates a period of time required to retain a profile of a user); information with respect to a user/customer experience; one or more JSON files (see e.g., FIGS. 3.1-4.8); etc.

In one or more embodiments, information associated with a hardware resource set (e.g., including at least resource related parameters) may specify, for example (but not limited to): a configurable CPU option (e.g., a valid/legitimate vCPU count per IN in the system (100)), a configurable network resource option (e.g., enabling/disabling single-root input/output virtualization (SR-IOV) for the IN (120)), a configurable memory option (e.g., maximum and minimum memory per IN in the system (100)), a configurable GPU option (e.g., allowable scheduling policy and/or virtual GPU (vGPU) count combinations per IN in the system (100)), a configurable DPU option (e.g., legitimacy of disabling inter-integrated circuit (I2C) for various INs in the system (100)), a configurable storage space option (e.g., a list of disk cloning technologies across one or more INs in the system (100)), a configurable storage input/output (I/O) option (e.g., a list of possible file system block sizes across all target file systems), a user type (e.g., a knowledge worker, a task worker with relatively low-end compute requirements, a high-end user that requires a rich multimedia experience, etc.), a network resource related template (e.g., a 10 GB/s BW with 20 ms latency quality of service (QoS) template), a DPU related template (e.g., a 1 GB/s BW vDPU with 1 GB vDPU frame buffer template), a GPU related template (e.g., a depth-first vGPU with 1 GB vGPU frame buffer template), a storage space related template (e.g., a 40 GB SSD storage template), a CPU related template (e.g., a 1 vCPU with 4 cores template), a memory resource related template (e.g., an 8 GB DRAM template), a vCPU count per analytics engine, a virtual NIC (vNIC) count per IN in the system (100), a wake on LAN support configuration (e.g., supported/enabled, not supported/disabled, etc.), a vGPU count per IN in the system (100), a type of a vGPU scheduling policy (e.g., a "fixed share" vGPU scheduling policy), a storage mode configuration (e.g., an enabled high-performance storage array mode), etc.

In one or more embodiments, as being telemetry data, a system log (e.g., a file that records system activities across hardware and/or software components of a client, an internal lifecycle controller log (which may be generated as a result of internal testing of a NIC), etc.) may include (or specify), for example (but not limited to): a type of an asset (e.g., a type of a workload such as an SQL database, a NAS executing on-premises, a VM executing on a multi-cloud infrastructure, etc.) that is utilized by a user; computing resource utilization data (or key performance metrics including estimates, measurements, etc.) (e.g., data related to a user's maximum, minimum, and average CPU utilizations, an amount of storage or memory resource utilized by a user, an amount of networking resource utilized by user to perform a network operation, etc.) regarding computing resources of a client (e.g., 110A); an alert that is triggered in a client (e.g., based on a failed cloud disaster recovery operation (which is initiated by a user), the client may generate a failure alert); an important keyword associated with a hardware component of a client (e.g., recommended maximum CPU operating temperature is 75° C.); a computing functionality of a microservice (e.g., Microservice A's CPU utilization is 26%, Microservice B's GPU utilization is 38%, etc.); an amount of storage or memory resource (e.g., stack memory, heap memory, cache memory, etc.) utilized by a microservice (e.g., executing on a client); a certain file operation performed by a microservice; an amount of networking resource utilized by a microservice to perform a network operation (e.g., to publish and coordinate inter-process communications); an amount of bare metal communications executed by a microservice (e.g., I/O operations executed by the microservice per second); a quantity of threads (e.g., a term indicating the quantity of operations that may be handled by a processor at once) utilized by a process that is executed by a microservice; an identifier of a client's manufacturer; media access control (MAC) information of a client; an amount of bare metal communication executed by a client (e.g., I/O operations executed by a client per second); etc.

In one or more embodiments, an alert (e.g., a predictive alert, a proactive alert, a technical alert, etc.) may be defined by a vendor of a corresponding client (e.g., 110A), by an administrator, by another entity, or any combination thereof. In one or more embodiments, an alert may specify, for example (but not limited to): a medium-level of CPU overheating is detected, a recommended maximum CPU operating temperature is exceeded, etc. Further, an alert may be defined based on a data protection policy.

In one or more embodiments, an important keyword may be defined by a vendor of a corresponding client (e.g., 110A), by a technical support specialist, by the administrator, by another entity, or any combination thereof. In one or more embodiments, an important keyword may be a specific technical term or a vendor specific term that is used in a system log.

In one or more embodiments, as being telemetry data, an application log may include (or specify), for example (but not limited to): a type of a file system (e.g., a new technology file system (NTFS), a resilient file system (ReFS), etc.); a product identifier of an application; a version of an OS that an application is executing on; a display resolution configuration of a client; a health status of an application (e.g., healthy, unhealthy, etc.); warnings and/or errors reported for an application; a language setting of an OS; a setting of an application (e.g., a current setting that is being applied to an application either by a user or by default, in which the setting may be a font option that is selected by the user, a background setting of the application, etc.); a version of an application; a warning reported for an application (e.g., unknown software exception (0xc00d) occurred in the application at location 0x0007d); a type of an OS (e.g., a workstation OS); an amount of storage used by an application; a size of an application (size (e.g., 5 Megabytes (5 MB), 5 GB, etc.) of an application may specify how much storage space is being consumed by that application); a type of an application (a type of an application may specify that, for example, the application is a support, deployment, or recycling application); a priority of an application (e.g., a priority class of an application, described below); active and inactive session counts; etc.

As used herein, "unhealthy" may refer to a compromised health state (e.g., an unhealthy state), indicating a corresponding entity (e.g., a hardware component, a client, an application, etc.) has already or is likely to, in the future, be no longer able to provide the services that the entity has previously provided. The health state determination may be made via any method based on the aggregated health information without departing from the scope of the embodiments disclosed herein.

While the unstructured and/or structured data are illustrated as separate data structures and have been discussed as including a limited amount of specific information, any of the aforementioned data structures may be divided into any number of data structures, combined with any number of other data structures, and/or may include additional, less, and/or different information without departing from the scope of the embodiments disclosed herein.

Additionally, while illustrated as being stored in the database, any of the aforementioned data structures may be stored in different locations (e.g., in persistent storage of other computing devices) and/or spanned across any number of computing devices without departing from the scope of the embodiments disclosed herein.

In one or more embodiments, the unstructured and/or structured data may be updated (automatically) by third-party systems (e.g., platforms, marketplaces, etc.)) and/or by the administrators based on, for example, newer (e.g., updated) versions of SLAs. The unstructured and/or structured data may also be updated when, for example (but not limited to): newer system logs are received, a state of an IN (e.g., 120) is changed, etc.

While the database has been illustrated and described as including a limited number and type of data, the database may store additional, less, and/or different data without departing from the scope of the embodiments disclosed herein. One of ordinary skill will appreciate that the database may perform other functionalities without departing from the scope of the embodiments disclosed herein.

While FIG. 1 shows a configuration of components, other system configurations may be used without departing from the scope of the embodiments disclosed herein.

Turning now to FIG. 2.1, FIG. 2.1 shows a diagram of an analyzer (200) (more specifically, a diagram of the visualizer (202) that is part of the analyzer (200)) in accordance with one or more embodiments disclosed herein. The analyzer (200) may be an example of the analyzer discussed above in reference to FIG. 1. The analyzer (200) includes the visualizer (202). The analyzer (200) may include additional, fewer, and/or different components without departing from the scope of the embodiments disclosed herein. Each component may be operably connected to any of the other component via any combination of wired and/or wireless connections. Each component illustrated in FIG. 2.1 is discussed below.

In one or more embodiments, the visualizer (202) may be, for example (but not limited to): a GUI, an API, a programmatic interface, a flexible user interface, a communication channel, etc. Further, the visualizer (202) may include functionality to, e.g.: (i) for a better user/administrator experience, assist the user to (a) upload one or more JSON files (via a "browse" button/symbol/icon and/or by clicking the plus "+" icon to add more JSON files) and (b) select/modify/define JSON file grouping/merging criteria (via one or more dropdown buttons (e.g., "Equals|Contains" buttons, a "Key Name" button, a "Data Type" button, a "Key Structure/Schema" button, "OR|AND" buttons, an "Initiate Grouping" button, etc.)) while managing one or more JSON files/data that are obtained from different sources (e.g., IoT devices, wearable devices, etc.); (ii) obtain/retrieve/receive data (e.g., any type and/or quantity of input) from any source (e.g., from a user via a client (e.g., 110A, FIG. 1), from the database, etc.) (and, if necessary, aggregate the data); (iii) based on (ii) and by employing a set of linear, non-linear, and/or ML models, analyze, for example, a user's query to derive additional data; (iv) encompass hardware and/or software components and functionalities provided by the analyzer (200) to operate as a service over the network (e.g., 130, FIG. 1) so that the visualizer (202) may be used externally; (v) employ a set of subroutine definitions, protocols, and/or hardware/software components for enabling/facilitating communications between, for example, the analyzer (200) and external entities (e.g., clients, administrators, etc.); (vi) by generating one or more visual elements (see e.g., FIGS. 3.1-4.8), allow an administrator to, at least, interact with a user of a corresponding client (e.g., 110A, FIG. 1); (vii) receive a customer/user profile of a customer and display the customer profile to an administrator (e.g., for monitoring and/or performance evaluation); (viii) concurrently display one or more separate windows (referring to FIG. 2.2, for example, the visualizer (202) may display an output file after grouping/merging of JSON files are completed based on user-defined parameters (e.g., selected conditions), in which, using a "Download" button, the user may download the output file for further analysis); and/or (ix) generate visualizations of methods illustrated in FIGS. 5.1-5.5.

One of ordinary skill will appreciate that the visualizer (202) may perform other functionalities without departing from the scope of the embodiments disclosed herein. The visualizer (202) may be implemented using hardware (e.g., any number of integrated circuits for processing computer readable instructions), software (e.g., a computer program executing on the underlying hardware of the analyzer (200)), or any combination thereof.

One of ordinary skill will appreciate that the analyzer (200) may perform other functionalities without departing from the scope of the embodiments disclosed herein.

Turning now to FIG. 2.2, FIG. 2.2 shows a diagram of the visualizer (202) in accordance with one or more embodiments disclosed herein. Details of the information illustrated in FIG. 2.2 are described above in reference to FIGS. 1 and 2.1.

FIGS. 3.1-3.3 show an example use case (or a scenario) in accordance with one or more embodiments disclosed herein. The example scenario (where a related user wants to group/merge two sample JSON files that are obtained from different sources), illustrated in FIGS. 3.1-3.3 and described below, is explanatory purposes only and not intended to limit the scope disclosed herein.

Turning now to FIG. 3.1, assume here that the user set the merging criteria to "key name" and "key structure", and one of the JSON sample files (e.g., Sample File 1) specifies the following: {"storeName": "THL", "location": "City Center", "laptops": [{"brand": "BGG", "model": "XXYY 13", "processor": "A Core i7", "ram": "16 GB", "storage": "512 GB SSD", "displaySize": "13.3 inches", "price": $1299.99, "availability": "In Stock"}, {"brand": "AGG", "model": "ZZ x360", "processor": "C 9", "ram": "32 GB", "storage": "1 terabyte (TB) SSD", "displaySize": "15.6 inches", "price": $1599.99, "availability": "Out of Stock"}, {"brand": "CGG", "model": "TT Air", "processor": "D1", "ram": "8 GB", "storage": "256 GB SSD", "displaySize": "13.3 inches", "price": $1099.99, "availability": "In Stock"},]}.

Turning now to FIG. 3.2, assume here that the user set the merging criteria to "key name" and "key structure", and the other sample file (e.g., Sample File 2) specifies the following: {"storeName": "THL", "location": "City Center", "laptops": [{"brand": "CGG", "model": "TT Air", "processor": "D1", "ram": "8 GB", "storage": "256 GB SSD", "displaySize": "13.3 inches", "price": $1099.99, "availability": "In Stock"}, {"brand": "BGG", "model": "XXYY $5^{th}$ Generation", "processor": "A Core i10", "ram": "32 GB", "storage": "1 TB SSD", "displaySize": "13.3 inches", "price": $12999.99, "availability": "In Stock"},]}.

Turning now to FIG. 3.3, based on the merging criteria and by employing a linear model, a non-linear model, and/or an ML model (e.g., a trained model, a fine-tuned model, etc.), the analyzer (e.g., 200, FIG. 2.1) may merge "Sample File 1" and "Sample File 2" to generate an output file, which specifies: {"storeName": "THL", "location": "City Center", "laptops": [{"brand": "BGG", "model": "XXYY 13", "processor": "A Core i7", "ram": "16 GB", "storage": "512 GB SSD", "displaySize": "13.3 inches", "price": $1299.99, "availability": "In Stock"}, {"brand": "AGG", "model": "ZZ x360", "processor": "C 9", "ram": "32 GB", "storage": "1 TB SSD", "displaySize": "15.6 inches", "price": $1599.99, "availability": "Out of Stock"}, {"brand": "CGG", "model": "TT Air", "processor": "D1", "ram": "8 GB", "storage": "256 GB SSD", "displaySize": "13.3 inches", "price": $1099.99, "availability": "In Stock"}, {"brand": "BGG", "model": "XXYY $5^{th}$ Generation", "processor": "A Core i10", "ram": "32 GB", "storage": "1 TB SSD", "displaySize": "13.3 inches", "price": $12999.99, "availability": "In Stock"},]}. Thereafter, the analyzer (e.g., 200, FIG. 2.1) may initiate displaying of the output file to the user via the visualizer (e.g., 202, FIG. 2.1).

In one or more embodiments, the model (employed by the analyzer (e.g., 200, FIG. 2.1)) may be a combination/mean of, for example, a linear regression model, a decision tree classifier model, a random forest model, and/or an extreme gradient boosting model. Further, generation, retraining, adjustment, and/or fine-tuning (e.g., based on an administrator's request, when newer/better training data is received, in order to increase the accuracy of the model in different conditions, etc.) of the model may be performed by the analyzer (e.g., 200, FIG. 2.1).

In one or more embodiments, to consider custom data (e.g., newer/better training data) in the model, the administrator may need to include the custom data in an input prompt before sending the prompt to a model API of the analyzer (e.g., 200, FIG. 2.1). To manage the custom data more effectively, the custom data may be transformed into one or more embedding vectors and stored to a vector database (not shown). These vectors may then be retrieved based on the prompt, and the resulting data may be combined with the prompt to form a newer prompt (e.g., to subsequently invoke the model in order to obtain responses that consider the custom data).

Despite the generalization capabilities of the model (or the trained model), issues may arise when applying the model to use cases that require, for example, organization (or business) domain knowledge. For example, in an organization setting with various types of components, if images of these components (e.g., a product catalog including one or more parts that need to be used to manufacture a related product) have not been part of the model's training data, distinguishing these images may be challenging. To prevent that (and/or upon receiving feedback from the administrator indicating that the accuracy of the trained model is low/dissatisfactory), the analyzer (e.g., 200, FIG. 2.1) may fine-tune the trained model to obtain a fine-tuned trained model. To fine-tune, the analyzer (e.g., 200, FIG. 2.1) may (i) request/obtain annotated data sets (e.g., to address specific part requirements of a related product (or a product manufacturing process)) (after the annotated data sets are first preprocessed by the analyzer), (ii) freeze one or more portions of the trained model's parameters (e.g., fixing or freezing 80% parameters of the trained model during the fine-tuning), (iii) retrain the trained model (especially, for example, if a vendor-specific custom part data has been updated, the trained model may need to be retrained); and/or (iv) use in-context learning capabilities of the trained model (by, for example, (a) externalizing a custom KB from model calls, (b) searching for relevant knowledge in the base, (c) rebuilding prompts, and/or (d) recalling the model).

In one or more embodiments, the analyzer (e.g., 200, FIG. 2.1) may be configured to obtain output(s) of trained components, determine errors related to the components, and generate a parameter update for the components according to the errors. In one or more embodiments, the analyzer (e.g., 200, FIG. 2.1) may generate the parameter update using any appropriate training method. For example, the analyzer (e.g., 200, FIG. 2.1) may use one or more of supervised learning, unsupervised learning, semi-supervised learning, self-supervised learning, distillation learning, and/or adversarial learning.

As indicated above, using/considering feedback (e.g., positive feedback, negative feedback, etc.) received from the administrator as input, via the visualizer (e.g., 202, FIG. 2.1), may cause the analyzer (e.g., 202, FIG. 2.1) to be considered as a closed-loop system because the analyzer (e.g., 202, FIG. 2.1) uses feedback in generating models. In light of this, the system (e.g., 100, FIG. 1) may support customization and continuous adjustments (e.g., of the models employed by the analyzer (e.g., 202, FIG. 2.1)) to match a user's definition of, for example, merging criteria.

Referring to FIG. 3.3, the analyzer (e.g., 200, FIG. 2.1) may merge "Sample File 1" and "Sample File 2" (where the payload of each file is merged into one file (i.e., the output file) by removing the redundant parts of the payload) because these files have a common key name and a common key structure.

FIGS. 4.1-4.8 show an example use case (or a scenario) in accordance with one or more embodiments disclosed herein. The example scenario (where a related user wants to group/merge two sample JSON files that are obtained from different sources), illustrated in FIGS. 4.1-4.8 and described below, is explanatory purposes only and not intended to limit the scope disclosed herein.

Turning now to FIGS. 4.1-4.2, assume here that the user set the merging criteria to "key structure", "data type", and "key name", and one of the JSON sample files (e.g., Sample File 1) specifies the following: {"storeName": "TE", "location": "Digital District", "laptops": [{"brand": "BGG", "model": "XXYY 15", "processor": {"manufacturer": "A", "model": "Core i9", "generation": "11$^{th}$ Gen", "quantity Available": 100}, "ram": "32 GB", "storage": {"type": "SSD", "capacity": "1 TB"}, "display": {"size": "15.6 inches", "resolution": "4K OLED"}, "price": $1999.99, "availability": "In Stock", "features": ["ESX 3080", "UUU 4 ports", "Backlit keyboard"], "customerReviews": [{"username": "ABC92", "rating": 4.5, "comment": "Powerful laptop with stunning display, perfect for gaming and work."}, {"username": "RRT", "rating": 5.0, "comment": "Absolutely amazed by the performance and build quality."},]}, {"brand": "AGG", "model": "EE 13", "processor": {"manufacturer": "C", "model": "7", "generation": "5000 Series", "quantity Available": 200}, "ram": "16 GB", "storage": {"type": "NVMe SSD", "capacity": "512 GB"}, "display": {"size": "13.3 inches", "resolution": "Full HD"}, "price": $1299.99, "availability": "In Stock", "features": ["Metal chassis", "Integrated RR graphics", "Fingerprint reader"], "customerReviews": [ ]},]}.

Turning now to FIGS. 4.3-4.4, assume here that the user set the merging criteria to "key structure", "data type", and "key name", and the other sample file (e.g., Sample File 2) specifies the following: {"storeName": "TE", "location": "Digital District", "laptops": [{"brand": "BGG 001", "model": "XXYY 15", "processor": {"manufacturer": "A", "model": "Core i9", "generation": "11$^{th}$ Gen", "quantityAvailable": "five"}, "ram": "32 GB", "storage": {"type": "SSD", "capacity": "1 TB"}, "display": {"size": "15.6 inches", "resolution": "4K OLED"}, "price": $1999.99, "availability": "In Stock", "features": ["ESX 3080", "UUU 4 ports", "Backlit keyboard"], "customerReviews": [{"username": "ABC92", "rating": 4.5, "comment": "Powerful laptop with stunning display, perfect for gaming and work."}, {"username": "RRT", "rating": 5.0, "comment": "Absolutely amazed by the performance and build quality."},]}, {"brand": "AGG", "model": "EE 13", "processor": {"manufacturer": "C", "model": "7", "generation": "5000 Series", "quantityAvailable": "ten"}, "ram": "16 GB", "storage": {"type": "NVMe SSD", "capacity": "512 GB"}, "display": {"size": "13.3 inches", "resolution": "Full HD"}, "price": $1299.99, "availability": "In Stock", "features": ["Metal chassis", "Integrated RR graphics", "Fingerprint reader"], "customerReviews": [ ]},]}.

In one or more embodiments, when the key structure matches (between the JSON files) but data types are different, the analyzer (e.g., 200, FIG. 2.1) may prompt/notify/recommend the user, via the visualizer (e.g., 202, FIG. 2.1), to proceed the merging process only with "key structure" and "key name", while ignoring "data type". In response to the prompt, if the user accepts the recommendation (e.g., if the user clicks on the YES button on the visualizer), the analyzer may then merge the payload of each JSON file. In response to the prompt, if the user rejects the recommendation (e.g., if the user clicks on the NO button on the visualizer), the analyzer may not merge the payload of each JSON file.

In one or more embodiments, if the user prefers to merge both sample files irrespective of the data types (where, for example, Sample File 1 specifies "quantity Available": 100 (numeric/integer) and Sample File 2 specifies "quantity Available": "five" (string)), the analyzer (e.g., 200, FIG. 2.1) may merge Sample File 1 and Sample File 2 into a single JSON file (e.g., an output file), as shown below in reference to FIGS. 4.5-4.8.

Turning now to FIGS. 4.5-4.8, based on the merging criteria and by employing the model (e.g., the trained model, the fine-tuned model, etc.), the analyzer (e.g., 200, FIG. 2.1) may merge "Sample File 1" and "Sample File 2" to generate an output file, which specifies: {"storeName": "TE", "location": "Digital District", "laptops": [{"brand": "BGG", "model": "XXYY 15", "processor": {"manufacturer": "A", "model": "Core i9", "generation": "11$^{th}$ Gen", "quantity Available": 100}, "ram": "32 GB", "storage": {"type": "SSD", "capacity": "1 TB"}, "display": {"size": "15.6 inches", "resolution": "4K OLED"}, "price": $1999.99, "availability": "In Stock", "features": ["ESX 3080", "UUU 4 ports", "Backlit keyboard"], "customerReviews": [{"username": "ABC92", "rating": 4.5, "comment": "Powerful laptop with stunning display, perfect for gaming and work."}, {"username": "RRT", "rating": 5.0, "comment":

"Absolutely amazed by the performance and build quality."},]}, {"brand": "AGG", "model": "EE 13", "processor": {"manufacturer": "C", "model": "7", "generation": "5000 Series", "quantity Available": 200}, "ram": "16 GB", "storage": {"type": "NVMe SSD", "capacity": "512 GB"}, "display": {"size": "13.3 inches", "resolution": "Full HD"}, "price": $1299.99, "availability": "In Stock", "features": ["Metal chassis", "Integrated RR graphics", "Fingerprint reader"], "customerReviews": [ ]}, {"brand": "BGG 001", "model": "XXYY 15", "processor": {"manufacturer": "A", "model": "Core i9", "generation": "11$^{th}$ Gen", "quantity Available": "five"}, "ram": "32 GB", "storage": {"type": "SSD", "capacity": "1 TB"}, "display": {"size": "15.6 inches", "resolution": "4K OLED"}, "price": $1999.99, "availability": "In Stock", "features": ["ESX 3080", "Back-lit keyboard", "Fingerprint reader"], "customerReviews": [{"username": "ABC92", "rating": 4.5, "comment": "Powerful laptop with stunning display, perfect for gaming and work."}, {"username": "RRT", "rating": 5.0, "comment": "Absolutely amazed by the performance and build quality."},]} {"brand": "AGG", "model": "EE 13", "processor": {"manufacturer": "C", "model": "7", "generation": "5000 Series", "quantity Available": "ten"}, "ram": "16 GB", "storage": {"type": "NVMe SSD", "capacity": "512 GB"}, "display": {"size": "13.3 inches", "resolution": "Full HD"}, "price": $1299.99, "availability": "In Stock", "features": ["Metal chassis", "Integrated RR graphics", "Fingerprint reader"], "customerReviews": [ ]},]}. Thereafter, the analyzer (e.g., 200, FIG. 2.1) may initiate displaying of the output file to the user via the visualizer (e.g., 202, FIG. 2.1).

As indicated above, each JSON file/data can be considered as a recipe, including ingredients and steps. The analyzer (e.g., 200, FIG. 2.1) may act/perform as a digital assistant (e.g., of a related user(s)) to treat each part of a JSON file (e.g., keys, values, etc.) as an essential recipe component. For example, the analyzer may consider data types (e.g., string, integer, etc.) as ingredient types that helps a related user to categorize his/her data.

Further, the analyzer (e.g., 200, FIG. 2.1) may let a related user to examine and compare details of data included in an input JSON file and/or in an output JSON file so that the user may have the ability to explore, organize, and/or generate meaningful relationships among/within his/her JSON data.

FIGS. 5.1-5.5 show a method for managing data in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 5.1, the method shown in FIG. 5.1 may be executed by, for example, the above-discussed analyzer (e.g., 200, FIG. 2.1). Other components of the system (100) illustrated in FIG. 1 may also execute all or part of the method shown in FIG. 5.1 without departing from the scope of the embodiments disclosed herein.

In Step 500, the analyzer receives, via the visualizer (e.g., 202, FIG. 2.1), a JSON file analysis request from an entity (e.g., a user of a client (e.g., 110A, FIG. 1), a web application that is being used by the user, an application terminal, etc.).

In one or more embodiments, the file analysis request may specify, for example (but not limited to): an identifier of a user, file merging/grouping criteria (e.g., user-defined parameters), one or more data paths to access one or more JSON files (e.g., obtain/access a first file from the database, obtain a second file from IoT Device R, obtain a third file from IoT Device T, etc.), etc. In one or more embodiments, the merging criteria may specify, for example (but not limited to): perform merging of two or more JSON files based on "key structure", "data type", and "key name" attribute match; perform merging of two or more JSON files based on "key structure" and "key name" attribute match; a key identifier of a key; a key structure of the key; a data type of the key identifier; etc.

In Step 501, upon receiving the request and by employing the model (e.g., the trained model), the analyzer, at least, obtains the first file (e.g., a JSON file specifying first sensor data that is obtained from a first sensor) using a first data path, the second file (e.g., a JSON file specifying second sensor data that is obtained from a second sensor) using a second data path, and the third file using a third data path. In one or more embodiments, the first sensor (e.g., an IoT device) and the second sensor (e.g., a wearable device) may be operably connected to each other over a network (e.g., 130, FIG. 1).

In one or more embodiments, for example, before obtaining the first file using the first data path, the analyzer may invoke the database to communicate with the database. After receiving the database's confirmation, the analyzer may obtain the first file from the database. The first file may be obtained continuously or at regular intervals (e.g., every two minutes) (without affecting production workloads of the database and the analyzer). Further, the first file may be access-protected for the transmission from, for example, the database to the analyzer, e.g., using encryption.

In one or more embodiments, the first file may be obtained as it becomes available or by the analyzer polling the database (via one or more API calls) for newer information. For example, based on receiving an API call from the analyzer, the database may allow the analyzer to obtain newer information.

In Step 502, by employing the trained model, the analyzer analyzes the merging criteria and the obtained files to understand/infer, for example (but not limited to): a source of each file (e.g., understanding the structure of JSON objects (e.g., key-value pairs) generated by each source/device, as well as the meaning of data fields specified in the JSON objects), identify common attributes across the files, define data relationships among the files (for example, if two JSON files share the same sensor type and timestamp, these files may be related and can be merged for further analysis), etc. Additional details of Step 502 are described below in reference to FIGS. 5.2-5.5.

In Step 504, based on the analysis performed in Step 502 (e.g., based on a first determination, a second determination, a third determination, and a text matching threshold), the analyzer infers that, for example, (i) the second file is suitable to be merged with the first file and (ii) the third file is not suitable to be merged with the first file. In one or more embodiments, the third file may be not suitable to be merged with the first file because the third file does not comprise a common attribute with the first file, in which the common attribute is a type of a timestamp or a type of a sensor device.

In Step 506, based on the merging criteria, the analyzer merges the first file and the second file to generate an output file. In Step 508, via the visualizer (e.g., a GUI), the analyzer initiates displaying of the output file to the user.

In one or more embodiments, the output file may specify, for example (but not limited to): an identifier of a physical store, location information of the physical store, brand information of a computing device, model information of the computing device, a manufacturer's identifier of the computing device, details of a hardware resource set associated with the computing device, a user's review with respect to the computing device, etc. In one or more embodiments, the method may end following Step 508.

Turning now to FIG. 5.2, the method shown in FIG. 5.2 may be executed by, for example, the above-discussed analyzer. Other components of the system (100) illustrated in FIG. 1 may also execute all or part of the method shown in FIG. 5.2 without departing from the scope of the embodiments disclosed herein.

In Step 510, the analyzer makes a first determination (in real-time or near real-time) as to whether the merging criteria specify "key name/identifier" and "key structure" (e.g., the merge process needs to be performed when there is a "key identifier" and a "key structure" match between JSON files). Accordingly, in one or more embodiments, if the result of the first determination is NO, the method proceeds to Step 518 of FIG. 5.4. If the result of the first determination is YES, the method alternatively proceeds to Step 512.

In Step 512, as a result of the first determination in Step 510 being YES, the analyzer makes a second determination (in real-time or near real-time) as to whether the merge process should be performed irrespective of data types of key identifiers (e.g., files needs to be merged irrespective of a data type of each key identifier specified in each file of files). Accordingly, in one or more embodiments, if the result of the second determination is NO, the method proceeds to Step 524 of FIG. 5.5. If the result of the second determination is YES, the method alternatively proceeds to Step 513.

In Step 513, as a result of the second determination in Step 512 being YES, the analyzer makes a third determination (in real-time or near real-time) as to whether any specific "primary key identifier and value" criterion (upon which the merge process to be carried out) is specified. Accordingly, in one or more embodiments, if the result of the third determination is NO, the method may end (said another way, proceeds to Step 504 of FIG. 5.1). If the result of the third determination is YES (where (i) the analyzer may ask/notify, via the visualizer, the user to provide specific primary keys and their values that need to considered while merging corresponding files or (ii) the specific "primary key identifier and value" criterion is specified in the merging criteria), the method alternatively proceeds to Step 514 of FIG. 5.3.

Turning now to FIG. 5.3, the method shown in FIG. 5.3 may be executed by, for example, the above-discussed analyzer. Other components of the system (100) illustrated in FIG. 1 may also execute all or part of the method shown in FIG. 5.3 without departing from the scope of the embodiments disclosed herein.

In Step 514, as a result of the third determination in Step 513 being YES, the analyzer makes a fourth determination (in real-time or near real-time) as to whether the merge process should be performed based on a text matching threshold/percentage (that is specified (by the user) in the request received in Step 500 of FIG. 5.1). Accordingly, in one or more embodiments, if the result of the fourth determination is NO, the method may end (said another way, proceeds to Step 504 of FIG. 5.1). If the result of the fourth determination is YES, the method alternatively proceeds to Step 516.

In Step 516, as a result of the fourth determination in Step 514 being YES, the analyzer asks/notifies, via the visualizer, the user to provide the threshold that needs to considered while merging corresponding files. In response to that, the analyzer may receive, via the visualizer, the threshold from the user. In one or more embodiments, the threshold may specify, for example, that Text 1 and Text 2 should be considered as matched when Text 1 is matching at least 80% of Text 2. Further, the threshold may also specify that text translations (e.g., "MB" can be interpreted as Megabyte (or vice versa), "in." can be interpreted as inch (or vice versa), etc.) can also be considered while comparing Text 1 and Text 2 to infer text similarities between Text 1 and Text 2. In one or more embodiments, the method may end following Step 516 (said another way, proceeds to Step 504 of FIG. 5.1).

Turning now to FIG. 5.4, the method shown in FIG. 5.4 may be executed by, for example, the above-discussed analyzer. Other components of the system (100) illustrated in FIG. 1 may also execute all or part of the method shown in FIG. 5.4 without departing from the scope of the embodiments disclosed herein.

In Step 518, as a result of the first determination in Step 510 of FIG. 5.2 being NO, the analyzer deduces that JSON files (e.g., the first file, the second file, etc.) should only be merged based on common key names/identifiers. In Step 519, the analyzer makes a fifth determination (in real-time or near real-time) as to whether any specific "primary key identifier and value" criterion (upon which the merge process to be carried out) is specified. Accordingly, in one or more embodiments, if the result of the fifth determination is NO, the method may end (said another way, proceeds to Step 504 of FIG. 5.1). If the result of the fifth determination is YES (where (i) the analyzer may ask/notify, via the visualizer, the user to provide specific primary keys and their values that need to considered while merging corresponding files or (ii) the specific "primary key identifier and value" criterion is specified in the merging criteria), the method alternatively proceeds to Step 520.

In Step 520, as a result of the fifth determination in Step 519 being YES, the analyzer makes a sixth determination (in real-time or near real-time) as to whether the merge process should be performed based on a text matching threshold/percentage (that is specified (by the user) in the request received in Step 500 of FIG. 5.1). Accordingly, in one or more embodiments, if the result of the sixth determination is NO, the method may end (said another way, proceeds to Step 504 of FIG. 5.1). If the result of the sixth determination is YES, the method alternatively proceeds to Step 522.

In Step 522, as a result of the sixth determination in Step 520 being YES, the analyzer asks/notifies, via the visualizer, the user to provide the threshold (described above in reference to Step 516 of FIG. 5.3) that needs to considered while merging corresponding files. In response to that, the analyzer may receive, via the visualizer, the threshold from the user. In one or more embodiments, the method may end following Step 522 (said another way, proceeds to Step 504 of FIG. 5.1).

Turning now to FIG. 5.5, the method shown in FIG. 5.5 may be executed by, for example, the above-discussed analyzer. Other components of the system (100) illustrated in FIG. 1 may also execute all or part of the method shown in FIG. 5.5 without departing from the scope of the embodiments disclosed herein.

In Step 524, as a result of the second determination in Step 512 of FIG. 5.2 being NO, the analyzer deduces that JSON files (e.g., the first file, the second file, etc.) with differences in data types (e.g., of key identifiers) should not be merged. In Step 526, the analyzer makes a seventh determination (in real-time or near real-time) as to whether any specific "primary key identifier and value" criterion is specified. Accordingly, in one or more embodiments, if the result of the seventh determination is NO, the method may end (said another way, proceeds to Step 504 of FIG. 5.1). If the result of the seventh determination is YES (where (i) the analyzer may ask/notify, via the visualizer, the user to provide specific primary keys and their values that need to considered while merging corresponding files or (ii) the specific "primary key identifier and value" criterion is specified in the merging criteria), the method alternatively proceeds to Step 528.

In Step 528, as a result of the seventh determination in Step 526 being YES, the analyzer makes an eighth determination (in real-time or near real-time) as to whether the merge process should be performed based on a text matching threshold/percentage (that is specified (by the user) in the request received in Step 500 of FIG. 5.1). Accordingly, in one or more embodiments, if the result of the eighth determination is NO, the method may end (said another way, proceeds to Step 504 of FIG. 5.1). If the result of the eighth determination is YES, the method alternatively proceeds to Step 530.

In Step 530, as a result of the eighth determination in Step 520 being YES, the analyzer asks/notifies, via the visualizer, the user to provide the threshold (described above in reference to Step 516 of FIG. 5.3) that needs to considered while merging corresponding files. In response to that, the analyzer may receive, via the visualizer, the threshold from the user. In one or more embodiments, the method may end following Step 530 (said another way, proceeds to Step 504 of FIG. 5.1).

Turning now to FIG. 6, FIG. 6 shows a diagram of a computing device in accordance with one or more embodiments disclosed herein.

In one or more embodiments disclosed herein, the computing device (600) may include one or more computer processors (602), non-persistent storage (604) (e.g., volatile memory, such as RAM, cache memory), persistent storage (606) (e.g., a non-transitory computer readable medium, a hard disk, an optical drive such as a CD drive or a DVD drive, a Flash memory, etc.), a communication interface (612) (e.g., Bluetooth interface, infrared interface, network interface, optical interface, etc.), an input device(s) (610), an output device(s) (608), and numerous other elements (not shown) and functionalities. Each of these components is described below.

In one or more embodiments, the computer processor(s) (602) may be an integrated circuit for processing instructions. For example, the computer processor(s) (602) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (e.g., a LAN, a WAN, Internet, mobile network, etc.) and/or to another device, such as another computing device.

In one or more embodiments, the computing device (600) may include one or more output devices (608), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing data, the method comprising:
    receiving a file analysis request from a user, wherein the file analysis request comprises merging criteria, a first data path to access a first file, a second data path to access a second file, and a third data path to access a third file;
    obtaining the first file using the first data path, the second file using the second data path, and the third file using the third data path;
    analyzing, by an analyzer, the merging criteria and a plurality of files, wherein the plurality of files comprises the first file, the second file, and the third file, wherein the analyzing comprises:
        making a first determination that the plurality of files needs to be merged when there is a key identifier and a key structure match between the plurality of files, wherein the key identifier and the key structure match are common attributes between the plurality of files, wherein the merging criteria in the file analysis request specifies the key identifier and the key structure match;
        making, based on the first determination, a second determination that the plurality of files needs to be merged irrespective of a data type of each key identifier specified in each file of the plurality of files;
        making, based on the second determination, a third determination that the plurality of files needs to be merged based on a specific primary key criterion that is specified in the merging criteria;
        making, based on the third determination, a fourth determination that the plurality of files needs to be merged based on a text matching threshold, wherein the text matching threshold comprises a metric that specifies a minimum percentage of textual similarity required between the plurality of files; and
        obtaining, based on the fourth determination, the text matching threshold from the user;
    inferring, based on the first determination, the second determination, the third determination, and the text matching threshold, that the second file is suitable to be merged with the first file and the third file is not suitable to be merged with the first file, wherein the second file exceeded the text matching threshold, wherein the third file did not exceed the text matching threshold;
    merging, by the analyzer and based on the merging criteria, the first file and the second file to generate an output file, wherein the analyzer employs at least a machine learning (ML) model to generate the output file, wherein the ML model has been fine-tuned by the analyzer to improve accuracy in identifying similarities between data elements of the plurality of files to assist in generating the output file; and initiating, via a graphical user interface (GUI), displaying of the output file to the user, wherein the output file assists the user in performing an efficient analysis across the plurality of files, wherein the efficient analysis minimizes an amount of time and reduces a risk of errors associated with analyzing the plurality of files.

2. The method of claim 1,
wherein the first file is a first JavaScript Object Notation (JSON) file,
wherein the first file specifies first sensor data that is obtained from a first sensor,
wherein the second file is a second JSON file,
wherein the second file specifies second sensor data that is obtained from a second sensor, and
wherein the first sensor and the second sensor are operably connected to each other over a network.

3. The method of claim 2,
wherein the first sensor is an Internet of Things (IoT) device, and
wherein the second sensor is a wearable device.

4. The method of claim 1, wherein the third file is not suitable to be merged with the first file because the third file does not comprise a common attribute with the first file, wherein the common attribute is a first type of a timestamp or a second type of a sensor device.

5. The method of claim 1, wherein the merging criteria specify, at least, a second key identifier of a key, a second key structure, and a second data type of the second key identifier.

6. The method of claim 1, wherein the merging criteria is analyzed by employing a trained model.

7. The method of claim 1, wherein the output file specifies at least one selected from a group consisting of an identifier of a physical store, location information of the physical store, brand information of a computing device, model information of the computing device, a manufacturer's identifier of the computing device, details of a hardware resource set associated with the computing device, and a second user's review with respect to the computing device.

8. A method for managing data, the method comprising:
receiving a file analysis request from a user, wherein the file analysis request comprises merging criteria, a first data path to access a first file, a second data path to access a second file, and a third data path to access a third file;
obtaining the first file using the first data path, the second file using the second data path, and the third file using the third data path;
analyzing, by an analyzer, the merging criteria and a plurality of files, wherein the plurality of files comprises the first file, the second file, and the third file, wherein the analyzing comprises:
making a first determination that the plurality of files needs to be merged when there is a key identifier and a key structure match between the plurality of files, wherein the key identifier and the key structure match are common attributes between the plurality of files, wherein the merging criteria in the file analysis request specifies the key identifier and the key structure match;
making, based on the first determination, a second determination that the plurality of files need not to be merged irrespective of a data type of each key identifier specified in each file of the plurality of files;
deducing, based on the second determination, that a set of files with differences in data types need not to be merged;
making, based on the deducing, a third determination that the plurality of files needs to be merged based on a specific primary key criterion that is specified in the merging criteria;
making, based on the third determination, a fourth determination that the plurality of files needs to be merged based on a text matching threshold, wherein the text matching threshold comprises a metric that specifies a minimum percentage of textual similarity required between the plurality of files; and
obtaining, based on the fourth determination, the text matching threshold from the user;
inferring, based on the first determination, the second determination, the third determination, and the text matching threshold, that the second file is suitable to be merged with the first file and the third file is not suitable to be merged with the first file, wherein the second file exceeded the text matching threshold, wherein the third file did not exceed the text matching threshold;
merging, by the analyzer and based on the merging criteria, the first file and the second file to generate an output file, wherein the analyzer employs at least a machine learning (ML) model to generate the output file, wherein the ML model has been fine-tuned by the analyzer to improve accuracy in identifying similarities between data elements of the plurality of files to assist in generating the output file; and
initiating, via a graphical user interface (GUI), displaying of the output file to the user, wherein the output file assists the user in performing an efficient analysis across the plurality of files, wherein the efficient analysis minimizes an amount of time and reduces a risk of errors associated with analyzing the plurality of files.

9. The method of claim 8,
wherein the first file is a first JavaScript Object Notation (JSON) file,
wherein the first file specifies first sensor data that is obtained from a first sensor,
wherein the second file is a second JSON file,
wherein the second file specifies second sensor data that is obtained from a second sensor, and
wherein the first sensor and the second sensor are operably connected to each other over a network.

10. The method of claim 9,
wherein the first sensor is an Internet of Things (IoT) device, and
wherein the second sensor is a wearable device.

11. The method of claim 8, wherein the third file is not suitable to be merged with the first file because the third file does not comprise a common attribute with the first file, wherein the common attribute is a first type of a timestamp or a second type of a sensor device.

12. The method of claim 8, wherein the merging criteria specify, at least, a second key identifier of a key, a second key structure, and a second data type of the second key identifier.

13. The method of claim 8, wherein the merging criteria is analyzed by employing a trained model.

14. The method of claim 8, wherein the output file specifies at least one selected from a group consisting of an identifier of a physical store, location information of the physical store, brand information of a computing device, model information of the computing device, a manufacturer's identifier of the computing device, details of a hardware resource set associated with the computing device, and a second user's review with respect to the computing device.

15. A method for managing data, the method comprising:

receiving a file analysis request from a user, wherein the file analysis request comprises merging criteria, a first data path to access a first file, a second data path to access a second file, and a third data path to access a third file;

obtaining the first file using the first data path, the second file using the second data path, and the third file using the third data path;

analyzing, by an analyzer, the merging criteria and a plurality of files, wherein the plurality of files comprises the first file, the second file, and the third file, wherein the analyzing comprises:

making a first determination that the plurality of files need not to be merged when there is a key identifier and a key structure match between the plurality of files, wherein the key identifier and the key structure match are common attributes between the plurality of files, wherein the merging criteria in the file analysis request specifies does not specify the key identifier and the key structure match;

deducing, based on the first determination, that a set of files needs only to be merged based on a common key identifier;

making, based on the deducing, a second determination that the plurality of files needs to be merged based on a specific primary key criterion that is specified in the merging criteria;

making, based on the second determination, a third determination that the plurality of files needs to be merged based on a text matching threshold, wherein the text matching threshold comprises a metric that specifies a minimum percentage of textual similarity required between the plurality of files; and obtaining, based on the third determination, the text matching threshold from the user;

identifying, based on the first determination, the second determination, and the text matching threshold, that the second file is suitable to be merged with the first file and the third file is not suitable to be merged with the first file, wherein the second file exceeded the text matching threshold, wherein the third file did not exceed the text matching threshold;

merging, by the analyzer and based on the merging criteria, the first file and the second file to generate an output file, wherein the analyzer employs at least a machine learning (ML) model to generate the output file, wherein the ML model has been fine-tuned by the analyzer to improve accuracy in identifying similarities between data elements of the plurality of files to assist in generating the output file; and initiating, via a graphical user interface (GUI), displaying of the output file to the user, wherein the output file assists the user in performing an efficient analysis across the plurality of files, wherein the efficient analysis minimizes an amount of time and reduces a risk of errors associated with analyzing the plurality of files.

16. The method of claim 15, wherein the first file is a first JavaScript Object Notation (JSON) file, wherein the first file specifies first sensor data that is obtained from a first sensor, wherein the second file is a second JSON file, wherein the second file specifies second sensor data that is obtained from a second sensor, and wherein the first sensor and the second sensor are operably connected to each other over a network.

17. The method of claim 16, wherein the first sensor is an Internet of Things (IoT) device, and wherein the second sensor is a wearable device.

18. The method of claim 15, wherein the third file is not suitable to be merged with the first file because the third file does not comprise a common attribute with the first file, wherein the common attribute is a first type of a timestamp or a second type of a sensor device.

19. The method of claim 15, wherein the merging criteria specify, at least, a second key identifier of a key, a second key structure, and a second data type of the second key identifier.

20. The method of claim 15, wherein the merging criteria is analyzed by employing a trained model.

* * * * *